US008923585B1

(12) United States Patent
Peleg

(10) Patent No.: US 8,923,585 B1
(45) Date of Patent: Dec. 30, 2014

(54) METHOD AND SYSTEM FOR IMAGE-BASED ULCER DETECTION

(71) Applicant: Given Imaging Ltd., Yoqneam (IL)

(72) Inventor: Dori Peleg, Haifa (IL)

(73) Assignee: Given Imaging Ltd., Yoqneam (IL)

( * ) Notice: Subject to any disclaimer, the term of this patent is extended or adjusted under 35 U.S.C. 154(b) by 0 days.

(21) Appl. No.: 13/755,524

(22) Filed: Jan. 31, 2013

Related U.S. Application Data

(60) Provisional application No. 61/592,816, filed on Jan. 31, 2012.

(51) Int. Cl.
*G06K 9/00* (2006.01)
*A61B 5/00* (2006.01)

(52) U.S. Cl.
CPC ...................................... *A61B 5/004* (2013.01)
USPC ......................................................... 382/128

(58) Field of Classification Search
None
See application file for complete search history.

(56) References Cited

U.S. PATENT DOCUMENTS

| | | | |
|---|---|---|---|
| 4,278,077 A | 7/1981 | Mizumoto | |
| 4,936,823 A | 6/1990 | Colvin et al. | |
| 5,212,637 A | 5/1993 | Saxena | |
| 5,604,531 A | 2/1997 | Iddan et al. | |
| 5,697,384 A | 12/1997 | Miyawaki et al. | |
| 5,993,378 A | 11/1999 | Lemelson | |
| 6,240,312 B1 | 5/2001 | Alfano et al. | |
| 7,009,634 B2 | 3/2006 | Iddan et al. | |
| 7,567,692 B2 | 7/2009 | Buzaglo et al. | |
| 7,684,599 B2 | 3/2010 | Horn et al. | |
| 8,423,123 B2 | 4/2013 | Horn | |
| 2002/0103417 A1 | 8/2002 | Gazdzinski | |
| 2002/0177779 A1* | 11/2002 | Adler et al. | 600/476 |
| 2003/0167000 A1 | 9/2003 | Mullick et al. | |
| 2003/0208107 A1 | 11/2003 | Refael | |
| 2003/0223627 A1 | 12/2003 | Yoshida et al. | |
| 2004/0225223 A1 | 11/2004 | Honda et al. | |
| 2005/0152588 A1 | 7/2005 | Yoshida et al. | |
| 2005/0192476 A1* | 9/2005 | Homan et al. | 600/118 |
| 2005/0259854 A1 | 11/2005 | Arimura et al. | |
| 2006/0069317 A1 | 3/2006 | Horn et al. | |
| 2007/0078300 A1 | 4/2007 | Zinaty et al. | |
| 2007/0078335 A1 | 4/2007 | Horn | |
| 2010/0046816 A1 | 2/2010 | Igual-Munoz et al. | |

(Continued)

OTHER PUBLICATIONS

U.S. Appl. No. 14/262,078, filed Apr. 25, 2014.
Office action of U.S. Appl. No. 13/537,278 mailed Sep. 30, 2013.
Notice of Allowance U.S. Appl. No. 13/537,278 mailed Jan. 27, 2014.

(Continued)

*Primary Examiner* — Shefali Goradia
*Assistant Examiner* — Raphael Schwartz
(74) *Attorney, Agent, or Firm* — Pearl Cohen Zedek Latzer Baratz LLP

(57) ABSTRACT

Ulcer detection may include calculating ulcer head scores for image pixels, and calculating ulcer red region scores for pixels, each score correlated to the probability that the pixel color is typical to ulcer heads, ulcer red regions, or a other regions. Ulcer head scores may be compared to an ulcer head threshold level and, based on the results, ulcer head candidates may be obtained. Ulcer red region scores may be compared to a threshold and ulcer red region candidates may be obtained. Ulcer candidates may be formed by creating pairs including an ulcer head candidate and a potential ulcer red region candidate. A grade for ulcer candidates indicating the probability that the ulcer candidate is an ulcer may be used to generate a score for the image, the score indicating the probability that the image includes an ulcer.

20 Claims, 12 Drawing Sheets

(56) References Cited

U.S. PATENT DOCUMENTS

| | | |
|---|---|---|
| 2010/0183210 A1 | 7/2010 | Van Uitert et al. |
| 2010/0189326 A1 | 7/2010 | McGinnis et al. |
| 2011/0033094 A1 | 2/2011 | Zarkh et al. |
| 2011/0206250 A1 | 8/2011 | McGinnis et al. |
| 2012/0008838 A1 | 1/2012 | Guyon et al. |

OTHER PUBLICATIONS

Office Action of U.S. Appl. No. 13/441,130 mailed Mar. 13, 2014.

Notice of Allowance of U.S. Appl. No. 13/441,130 mailed Jan. 27, 2014.

U.S. Appl. No. 13/441,130 submitted Apr. 6, 2012.

* cited by examiner

METHOD AND SYSTEM FOR IMAGE-BASED ULCER DETECTION

PRIOR APPLICATION DATA

The present application claims benefit from prior U.S. provisional application No. 61/592,816 filed on Jan. 31, 2012, entitled "METHOD AND SYSTEM FOR IMAGE-BASED ULCER DETECTION", incorporated by reference herein in its entirety.

FIELD OF THE INVENTION

Embodiments of the present invention relate to systems and methods for ulcer detection. More specifically, embodiments of the present invention relate to systems and methods for automatically detecting ulcers within images captured in vivo by an in-vivo device traversing the gastrointestinal ("GI") tract.

BACKGROUND OF THE INVENTION

Mucosal erosions in the walls of the GI tract, typically referred to as ulcers or peptic ulcers, are a painful disease of the GI tract. Ulcers may occur in the stomach, doudenum and esophagus, etc.

Ulcers may be diagnosed based on various symptoms such as abdominal pain, or using tests such as endoscopies or barium contrast x-rays. For example, gastroscopy may provide direct visual identification of the ulcer and information related to the location and severity of the ulcer. Alternatively, a swallowable in-vivo device may travel in the GI tract, capture images of the GI tract, and send the images to a personal computer, workstation or portable recorder, where images can be analyzed and presented to a healthcare professional. The PillCam® capsule endoscopy system commercially available from the common assignee of the present invention, an autonomous swallowable imaging device similar to devices described in U.S. Pat. No. 7,009,634 and/or in U.S. Pat. No. 5,604,531, each of which are assigned to the common assignee of the present invention and each of which are hereby incorporated by reference in their entirety, is an example device that can be used to capture and send images. The healthcare professional may diagnose the presence of ulcers by visually inspecting the images sent from the swallowable imaging device, which is also referred to as "capsule endoscope" (CE).

A capsule endoscope video may include tens of thousands of images that were captured during the capsule's passage through the GI tract. Often, most of the images in the capsule endoscope ("CE") video are of healthy tissue and a much smaller number of images show pathological tissue, such that the reviewer may need a long time to identify images of diagnostic interest. An automatic detection of images showing pathological tissue, such as an ulcer, may save considerable reviewing time and increase the likelihood of detection of such pathological tissues by the reviewer.

Ulcers in the GI tract may have unique visual appearance. Typically, peptic ulcers are characterized by having a white-yellowish exudate region that is surrounded by an erythema region that is typically redder than healthy tissues.

SUMMARY OF THE INVENTION

According to embodiments of the invention there are provided systems and methods for ulcer detection which may detect ulcers in images or frames of the GI tract, which are captured in vivo by a swallowable imaging device. In one embodiment, the method for detecting ulcers may include obtaining an image comprising image pixels; calculating ulcer head scores for image pixels where each score may be correlated to the probability that the color of the associated image pixel is typical to ulcer heads; calculating ulcer red region scores for image pixels, where each score may be correlated to the probability that the color of the associated image pixel is typical to ulcer heads, or to ulcer red regions, or to a region that is neither ulcer head nor ulcer red region; comparing the ulcer head scores to an ulcer head threshold level and, based on the comparison results, obtaining or determining potential ulcer head candidates; comparing the ulcer red region scores to an ulcer red region threshold level and, based on the comparison results, obtaining or determining potential ulcer red region candidates; forming ulcer candidates by creating pairs where each pair includes a potential ulcer head candidate and a potential ulcer red region candidate; determining a grade for each ulcer candidate, the grade indicating the probability that the ulcer candidate is an ulcer; and determining a score for the entire image based on the grades, the score indicating the probability that the image includes an ulcer.

According to one embodiment, one or more threshold levels may be applied to the ulcer head scores to remove (e.g., filtering out) ulcer head candidates whose area exceeds a range of area sizes typical to ulcer heads, and one or more threshold levels may be applied to the ulcer red region scores to remove (e.g., filtering out) ulcer red region candidates whose area exceeds a range of area sizes typical to ulcer red regions. Suitability criteria may be used to find at least some of the remaining ulcer head candidates that are suitable for pairing with at least some of the remaining ulcer red region candidates. A suitability value may be calculated for each suitable pair, and a pairing rule may be used to determine which particular ulcer red region candidate is most suitable for which particular ulcer head candidate (or vice versa) based on the suitability values. Each pair that includes an ulcer head candidate and a suitable ulcer red region, or an ulcer red region candidate and a suitable ulcer head candidate, forms an ulcer candidate. (The process that finds a suitable ulcer red region candidate for an ulcer head candidate (or vice versa) may repeat for each potential ulcer head candidate, or potential ulcer red region candidate, as the case may be.)

A grade may be determined for each ulcer candidate in the image, which is formed by an ulcer head candidate and an ulcer red region candidate that are paired, which indicates the probability that the ulcer candidate is an ulcer. Determining the grade for the ulcer candidate may include calculating a property vector that may include features describing properties of the ulcer candidate, and employing a classifier (e.g., trained classifier) on the property vector to generate the grade from the property vector. Based on the grades of the ulcer candidates, an image score may be determined for the image, which score may indicate the probability that the image includes an ulcer.

An ulcer head threshold level may be selected among a number of ulcer head threshold levels, and each ulcer head threshold level may provide additional potential ulcer head candidates. The ulcer red region threshold level may be selected among a plurality of ulcer red region threshold levels, and each ulcer head threshold level may provide additional potential ulcer head candidates.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
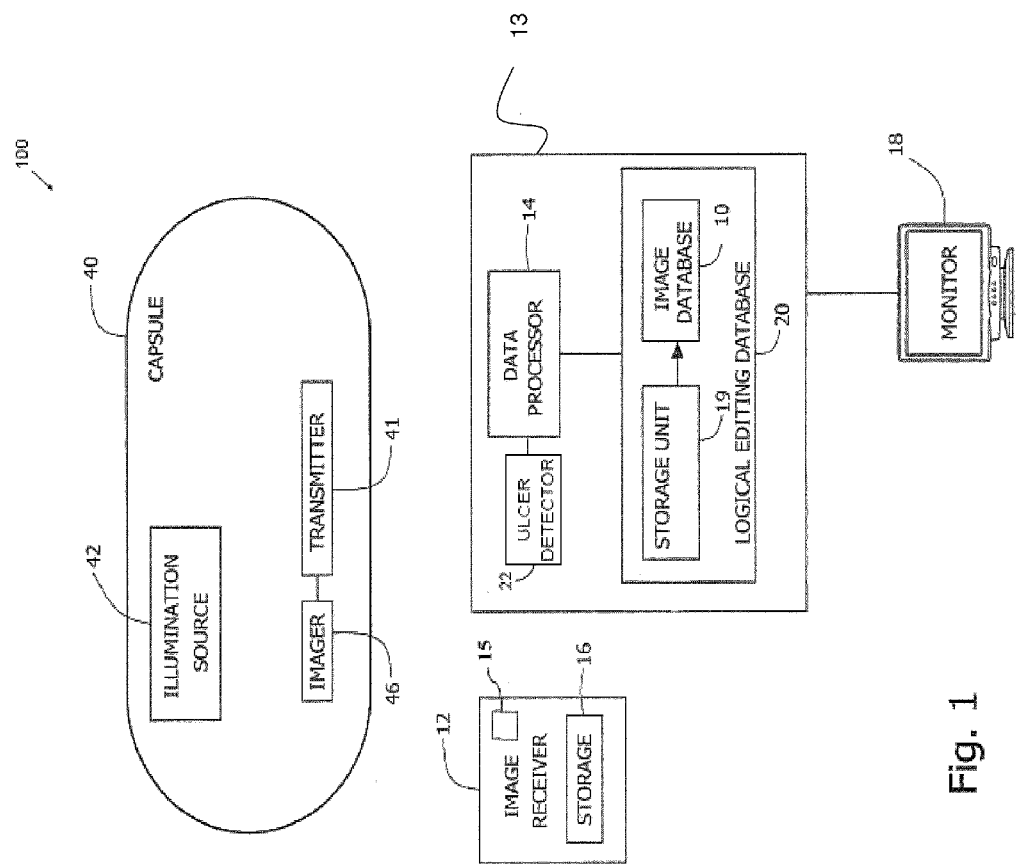
FIG. 1 schematically illustrates an in-vivo imaging system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", "inferring", "deducing" or the like, may refer to operation(s) and/or process(es) of a computer, a computing platform, a computing system, or other electronic computing device, that manipulates data and/or transforms data, which is represented as physical (e.g., electronic) quantities within the computer's registers and/or memories, into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not limited to a particular order or sequence. Additionally, some of the described method embodiments or steps/elements thereof can occur or be performed or executed at the same time.

Ulcers are typically characterized by having two visually distinct regions: an exudate region, which typically is whitish-yellow and an erythema region that typically is red or reddish and encircles or circumscribes, at least partly, the exudate region. The exudate region of an ulcer is referred to herein as ulcer 'head', and the erythema region of an ulcer is referred to herein as 'ulcer red region'. Color of healthy tissues is typically pale/lighter red. Therefore, visually, ulcers are visually conspicuous relative to healthy tissue that surrounds them and, therefore, they can be detected by detecting their distinct regions.

Detecting an ulcer in an image or image frame generally involves detecting the distinct regions and estimating the probability that the distinct regions belong to an ulcer. Since there is no 100% certainty that such regions belong to or represent ulcers (there might be regions in an image that do not belong or represent an ulcer), 'ulcer head' and 'ulcer red region' are referred to herein as candidates. An image may contain a plurality of ulcer head candidates and a plurality of ulcer red region candidates, and an attempt is made to pair at least one ulcer head candidate with one suitable ulcer red region candidate to thereby find at least one ulcer candidate in the image. If the attempt to pair ulcer head candidates with suitable ulcer red region candidates is successful, the resultant ulcer candidates may be graded on individual basis, and the image, as a whole, may be scored based on the grades of all or selected ulcer candidates in that image. However, if the attempt to pair at least one ulcer head candidate with a suitable ulcer red region candidate (or vice versa) fails, the image may be regarded as an ulcer-free image, and the image may be scored accordingly.

In general, the reliability of the process for finding ulcer candidates depends, for example, on the method that is used to detect the ulcer's distinct regions (e.g., ulcer head and ulcer red region), and on the method that is used to pair an ulcer head candidate with a suitable ulcer red region candidate. Since more than one ulcer red region candidates might be in the region of a particular ulcer head candidate, and an ulcer can have associated with it only one ulcer red region, it may be required to determine which one of the ulcer red region candidates is to be 'paired' with the ulcer head candidate. The reliability of the pairing process should be as high as possible because a grade calculated for an ulcer candidate indicates the probability that the ulcer candidate is an ulcer, and pairing an unsuitable ulcer red region with an ulcer head candidate might result in a low ulcer grade even if the ulcer head candidate is or represents a real ulcer head. Likewise, pairing an unsuitable ulcer head candidate with an ulcer red region candidate might also result in a low ulcer grade even if the ulcer red candidate is or represents a real ulcer red region.

FIG. 1 schematically illustrates an in-vivo imaging system 100 according to embodiments of the present invention. According to some embodiments, system 100 may include an in-vivo imaging device 40. In-vivo imaging device 40 may autonomously move in the GI system (e.g., by using peristalsis) and capture images in vivo. Imaging device 40 may be a swallowable in-vivo capsule, but other types of devices or suitable implementations may be used. According to one embodiment, imaging device 40 may communicate with an external receiving and display system in order to facilitate reception of images, display of data (e.g., image data), control of imaging device 40, and/or other functions. Power may be provided to imaging device 40 by an internal battery or wirelessly (e.g., through magnetic induction).

Device 40 may include an imager 46 for capturing images, an illumination source 42 for illuminating the body lumen, and a transmitter 41 for transmitting image frames to a receiving device. An image frame may include image data and various types of metadata or information. Transmitter 41 may include a receiver, or be replaced by a transceiver, in order to enable imaging device 40 to wirelessly receive control information from an external system. An optical system, including, for example, lenses and/or mirrors, may be used to focus light onto imager 46.

In-vivo imaging system 100 may also include a receiver 12 and a workstation 13. Receiver 12 may include an antenna or an antenna array (the antennas are not shown in FIG. 1), a data processor 15 and a storage unit 16 (e.g., a memory, hard drive, etc.). Workstation 13 may include a data processor 14, a logical editing database ("LEDb") 20, and an ulcer detector 22. LEDb 20 may include an image database 10 and a storage unit 19 (e.g., a memory, hard drive, etc.). In-vivo imaging system 100 may also include a monitor 18 for displaying, for example, images captured by device 40 and received by receiver 12. Receiver 12 may be small and portable, and it may be worn on the patient's body during operation. Storage unit 16 and storage unit 19 may store code or instructions which, when executed by a processor, perform methods as disclosed herein. Storage units 19 and image database 10 may also store data such as image frames, image streams, and data indicative of the probability that a particular image includes at least one ulcer.

Data processor 14, storage unit 19 and monitor 18 may be part of a personal computer or workstation that includes standard processor, memory, disk drive, and input-output (I/O) devices, and embodiments of the present invention may be implemented using any suitable computing system or platform. Data processors 14 and/or 15 may include any standard data processor, such as a microprocessor, multiprocessor, accelerator board, or any other serial or parallel high performance data processor. Monitor 18 may be a computer screen, a conventional video display, or any other device capable of displaying images and/or textual data.

Imager 46 may be a complementary metal-oxide-semiconductor (CMOS) camera or another device, for example, a charge-coupled device (CCD). Illumination source 42 may include, for example, one or more light emitting diodes (LEDs), or another suitable light source. In operation, imager 46 may capture images and send data representing the images (e.g., image data) to transmitter 41, which may transfer images (e.g., using wireless transmission) to receiver 12. Receiver 12 may permanently or temporarily store the image data in storage unit 16. After a certain period of time during which image data is received and stored in storage unit 16, image data that is stored in storage unit 16 may be transferred to workstation 13, for example in order for it to be processed by data processor 14. For example, storage unit 16, which may be detachably connected to receiver 12, may be detached from the receiver and be connected to a personal computer or workstation 13 via a standard data link, e.g., via a serial or parallel interface. Image data may be transferred from storage unit 16 to image database 10 or to storage unit 19. Storage unit 19 may store a series of images recorded by device 40. Images that imaging device 40 captures as it moves through a patient's GI tract may be combined to form a moving image stream (e.g., image movie). Data processor 14 may analyze and edit the moving image stream, for example according to criteria or rules that may be stored in logical editing database 20, and provide the analyzed and/or edited data to image monitor 18, in order for it to be viewed by health professional. Data processor 14 may execute software which, in conjunction with basic operating software such as an operating system and device drivers, controls its operation.

The image data collected and stored may be stored temporarily or permanently, transferred to other locations for, for example, manipulation or analysis. A health professional may use images or image frames to diagnose pathological conditions of, for example, the GI tract, such as ulcers, and, in addition, the system may provide information about the location of these pathologies. Image data may be viewed in real time or off line. Device 40 may collect a series of still images as it traverses the GI tract. The images may be later presented as, for example, a stream of images or a moving image of the traverse of the GI tract. The in-vivo imager system may collect a large volume of data, as it may take device 40 several hours to traverse the entire GI tract. Imager 46 may record (and output) images at a rate of, for example, four to forty images per second (other rates, such as two frames per second, may be used).

Preferably, images originating from device 40 are color images, although other image formats may be used. By way of example, each frame of image data may include image data corresponding to, or output by, a pixel array of 256×256 pixels, where each pixel includes, or has associated with it, digital data that may represent its color and brightness. Some of the pixels may be designed to output a first primary color (e.g., red), other pixels may be designed to output a second primary color (e.g., blue), and the remaining pixels may be designed to output a third primary color (e.g., green). The brightness level of each pixel may be represented by a value of a byte (e.g., 0-255). Alternatively, each pixel's color data may be represented by cylindrical-coordinate representation formats such as hue, saturation and lightness (HSL, or HLS), hue, saturation and value or brightness (HSV, or HSB), or hue, saturation and intensity (HIS). Cylindrical-coordinate representations of the RGB space are characterized by representing the color or hue information by the angle around a central vertical axis while the distance from the axis corresponds and the distance along the axis corresponds to other information such as saturation and brightness. For example, when using HSV representation, 'H' may represent the angle around the central vertical axis, 'S' may represent the distance from the axis, and 'V' may represent the distance along the axis. Alternatively, other representations may be used, such as YCbCr (Y is the luma or luminance component and Cb and Cr are the blue-difference and red-difference chroma components), Lab color space etc. According to one embodiment, images may be stored for example sequentially in data processor storage unit 19. The stored data may include one or more pixel properties, including H, S and V.

According to an embodiment of the present invention, ulcer detector 22 may be used to detect ulcers in images. Ulcer detector 22 may reside in imaging device 40, in receiver 12, or in workstation 13. Ulcer detector 22 (and other modules, classifiers, integrators and processes discussed herein) may be a dedicated processor (e.g., an ulcer detector processor) or it may be, or be implemented by, data processor 14 or 15 (e.g., it may be software or code stored in a memory such as storage units 16 or 19 and executed by a processor). While ulcer detector 22 is shown in FIG. 1 as a component, unit or element separate from, and functionally connected, to data processor 14, in some embodiments ulcer detector 22 may be a code or a set of instructions that may be executed, for example, by processor 14 or by processor 15. Ulcer detector 22 may be or include one or more dedicated processors.

While preferably, information gathering, storage, and processing are performed by certain units, the systems and methods of the present invention may be practiced with different configurations. For example, the components that gather, or collect, image information need not be contained in a capsule, as they may be contained in any other vehicle suitable for traversing a lumen in a human body. An endoscope, stent, catheter, and needle, to name a few, are examples of such vehicles.

Figure 2:
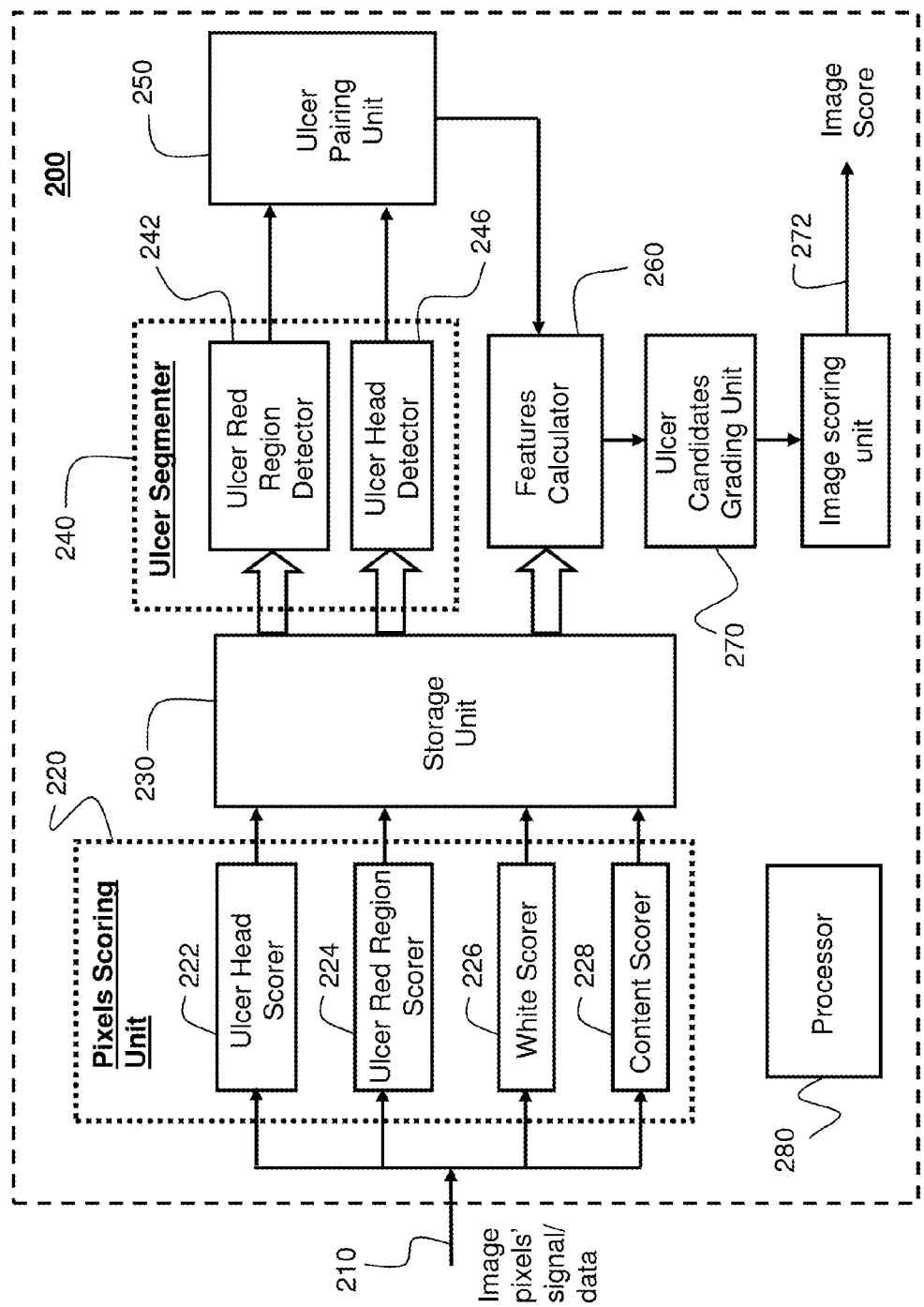
FIG. 2 is a schematic diagram illustrating an exemplary ulcer detector according to embodiments of the present invention.

FIG. 2 is a block diagram of an ulcer detector 200 according to an example embodiment. Ulcer detector 200 may include a pixel scoring unit ("PSU") 220 for scoring the output data of image pixels, a storage unit 230 for storing, inter alia, the resultant pixel scores, an ulcer segmenter 240 for identifying the distinct regions of ulcers (e.g., ulcer heads and ulcer red region), an ulcer pairing unit ("UPU") 250 for pairing ulcer head candidates with ulcer red region candidates, to thereby form ulcer candidates where each ulcer candidate includes one ulcer red region candidate and one ulcer head candidate, a features calculator 260 for calculating features for ulcer candidates in the image, an ulcer candidates grading unit ("CGU") 270 for calculating a grade, G(i), for each ulcer candidate based on the features, and an image scoring unit ("ISU") 272 for calculating a score for the image according to, or based on, the grades of ulcer candidates contained in the image.

PSU 220 may include an ulcer head scorer ("UHS") 222, an ulcer red scorer ("URS") 224, a white scorer 226, and a content scorer 228. Each of scorers 222, 224, 226 and 228 may calculate a score whose value may be within some predetermined score range. Each scorer may be configured to underscore different image characteristics. For example, UHS 222 may be configured to make ulcer heads more visually conspicuous; URS 224 may be configured to make ulcer red regions more visually conspicuous, for example by improving or enhancing the visual distinction between ulcer red regions and ulcer heads; white scorer 226 and content scorer 228 may respectively be configured to make bubbles and content more easily detectable. Each image pixel output value, or the output value of selected image pixels, may be scored by each of pixel scorers 222, 224, 226 and 228, and the resulting scores may be stored in storage unit 230 for processing. Processing pixels' scores may include, for example, segmentation of the image, identification of ulcer head candidates and ulcer red region candidates in the image, pairing ulcer head candidates with ulcer red region candidates, extracting features from ulcer candidates, etc. FIG. 2 is also described below in connection with FIG. 4. The range of scores associated with each pixel scorer may be chosen or set, for example, based on images of typical ulcers that were determined or obtained, for example, during a training process.

Processor 280 may control the operation of any of PSU 220, storing data in, and retrieving data from, storage unit 230, ulcer segmenter 240, ulcer pairing unit 250, features calculator 260, ulcer candidates grading unit 270, and image scoring unit 272. Processor 280, by executing software or instructions, may carry out steps which are performed by any one of PSU 220, ulcer segmenter 240, ulcer pairing unit 250, features calculator 260, ulcer candidates grading unit 270, and image scoring unit 272, and other functions in ulcer detector 200, and thus may function as these units. In some embodiments, processor 280 may be, or may function similar to, for example, processor 14. Storage unit 230 may be, or may function similar to, for example, storage unit 19.

A support vector machine ("SVM") is a statistical-based classifier used to recognize patterns after training: given a set of training examples, each marked as belonging to one of two categories or classes, an SVM training algorithm builds a model that assigns, or maps, new examples/values into one category/class or the other. An optimal line, or gap, is found, which distinguishes the two categories or classes. The SVM tool may be used to classify 'real'/measured color values as belonging to one category/class or another, by 'measuring' the distance, or 'closeness', of a real/measured color value from/to a line that separates the two classes, the distance indicating the probability that the real/measured value has been classified correctly. For example, the longer the distance between a measured value and the gap, the greater the probability that the measured value is correctly classified to one of the two classes. The distance, or closeness, of a real/measured value from/to the line, or gap, that separates two classes is herein referred to as 'score'.

Identifying Ulcer Heads by Using Ulcer Head Scores (e.g., Red Scores)

When a tissue including an ulcer is illuminated by a white light, the ulcer head appears as a white or yellowish region, whereas the ulcer region adjacent the ulcer's white or yellowish region, or the ulcer region surrounding, partly or wholly, the ulcer's white or yellowish region, is conspicuously red, or mostly red. Since the colors of ulcer heads are very distant, or distinct, from red, ulcer heads can relatively easily be detected, for example, by using 'red scores', which are example ulcer head scores. An 'ulcer head score' (e.g., 'red score') indicates, or is correlated to, the probability the color of the pixel is typical to ulcer heads. For example, if ulcer head scores are determined relative to the red color, the higher the ulcer head score of a pixel color, the redder the pixel's color; and the lower the ulcer head score, the more the pixel's color is 'not red'. While ulcer red regions are typically redder than healthy tissues (and therefore they may have, or may be associated with, relatively high red scores), pixels' output that represent ulcer heads have, or are associated with, relatively very low red scores. A SVM-RBF tool has been devised to score pixel output values according to their distance/closeness from/to red (hence the term 'red scores') in order to easily detect white and yellowish regions in images (e.g., GI images) that are generally characterized by being circumscribed, at least partly, by regions having red chromaticities.

Given a set of training examples, e.g., images which include identified red and non-red areas, a SVM training algorithm may build a model that identifies new samples, e.g., output of image area elements (e.g., image pixels) of, corresponding or related to, newly received images, as belonging to the red portion or to the non-red portion of the RGB space. The distance, or closeness, in the RBG color space, of the color from/to the SVM-RBF separating line may correspond to the red score value, which may therefore be calculated based on the distance, wherein a pixel's color located in the red portion of the color space may have a positive red score value, and a color in the a non-red portion of the color space may have a negative red score value. A non-linear classifier may be used to classify the red scores because it provides for a better separation (relative to linear classifiers) between distribution of red pixels and non-red pixels.

Ulcer head scorer 224 may include or use such a SVM/RBF tool to calculate, for example, red scores for the image pixels. The red scores, which collectively facilitate efficient detection of ulcer heads, may be processed by pixels segmenter 240, for example in the way described herein. Ulcer head scorer 224 may be configured to calculate, for any pixel, a red score whose value may be within a predetermined red score range, for example [−3.0/+3.0]. For example, a red score (−2.95) may be calculated for or assigned to a pixel imaging an ulcer red region; a red score (−2.78) may be calculated for or assigned to another pixel that images an ulcer head; a red score (+0.55) may be calculated for or assigned to a pixel imaging a health tissue; a red score (+1.20) may be calculated for or assigned to another pixel that images a relatively red healthy tissue, and so on.

The way ulcer head scores are calculated may be adapted to, depend on, or derived from the representation format of the pixels' color. For example, red scores, which are example ulcer head scores, may be used in conjunction with the R-B-G color format. If pixels' color data is represented by cylindrical-coordinate representation formats such as the ones mentioned above (e.g., HSL, HSV, HSB, HIS, etc.), other scoring methods may be used.

Identifying Ulcer Red Regions by Using Ulcer Red Region Scores (e.g., Ulcer Scores)

In general, ulcer red region scores are calculated and used to enhance color distinction/differentiation between ulcer heads and ulcer red regions in order to detect ulcer red regions. A first group of colors may be marked as 'positive' (the first group of colors may be assigned positive values) and a second group of colors may be marked as 'negative' (the second group of colors may be assigned negative values), and a classifier may be configured to generate a positive ulcer red region score for the first group of colors and a negative ulcer red region score for the second group of colors. The classifier may be configured to generate zero, or near zero, ulcer red region score for colors, called herein 'deviant colors', that are in-between these two groups of colors, or otherwise distant from these color groups, because the classifier may be indecisive as to which of the two color groups a deviant color belongs. An 'ulcer red region score' (e.g., ulcer score), therefore, generally indicates, or is correlated to, is correlated to the probability that the color of the associated image pixel is typical to ulcer heads, or to ulcer red regions, or to a region that is neither ulcer head nor ulcer red region. An ulcer red region score may also indicate the distance/closeness of a pixel color from/to two, visually distinct, groups of colors, for example from white and yellowish-white tones that characterize ulcer heads, and red tones that characterize typical ulcer red regions. For example, pixels' color may be assigned high positive ulcer red region score values for a first distinct color range (e.g., white/yellowish-white tones), low negative ulcer red region score values for a second distinct color range (e.g., red tones), and scores between the high score values and the low score values for pixel colors that are distant from the two distinct color ranges. For the purpose of displaying the pixel colors according to their ulcer red region scores, pixels that are assigned high ulcer red region score values may be displayed using red tones, pixels that are assigned low ulcer red region score values may be displayed using blue tones, and pixels that are assigned middle-range ulcer red region score values may be displayed using green tones and yellow tones.

Ulcer red scorer 222 may be configured to calculate, for any pixel, a score whose value is within a predetermined score range, for example [−3.0/+3.0]. Continuing the example, ulcer red scorer 222 may assign relatively high positive scores (e.g., +2.8, +3.0, etc.) to white regions and to yellowish regions; relatively low negative scores (e.g., −3.0, −2.8) to red and reddish regions, and 'neutral' (e.g., zero, near zero, or mid-range) scores (e.g., 0.0, +0.77, −0.3) to regions whose colors are not white, yellowish, red or reddish; namely, regions whose colors typically characterize healthy tissues. Ulcer red scores, therefore, diminish the detrimental effect that colors of healthy tissues might have on the ulcer detection process. A SVM-RBF tool may be trained to calculate ulcer red scores for image pixels, an ulcer red score per pixel color.

Given a set of training examples, e.g., images which include identified red and white area elements, a SVM training algorithm may build a model that identifies new samples, e.g., output of image area elements (e.g., image pixels) of, corresponding or related to, newly received images, as belong 'more' to the red portion or 'more' to the white portion of the RGB space. The distance, in the RBG color space, of a pixel's color from the SVM-RBF line or gap may be converted to an 'ulcer score' that has a relatively high positive score value if the pixel's color located is in the red portion of the color space, and to an ulcer score that has a relatively low negative score value if the pixel's color is in the white portion of the color space. The ulcer score value may correspond to the redness-whiteness color range such that, for example, a low negative ulcer score value may indicate a high redness level, and a high positive ulcer score value may indicate a high whiteness level. Thus, for example, red regions and white regions in the image may be made distinct. Preferably, the ulcer score values are spanned across the color space non-linearly because non-linear distribution of ulcer scores across the color space distinguishes between red pixels and white/whitish/yellowish pixels better than linear distribution.

Ulcer red scorer 222 may include such a SVM-RBF tool in order to calculate ulcer red scores for the image pixels. The ulcer red scores, which collectively facilitate efficient discrimination between ulcer heads (which typically have ulcer red scores in one end of the ulcer red score range) and ulcer red regions (which typically have ulcer red scores in other end of the ulcer red score range), may be processed by pixels segmenter 240, for example, in the way described below.

The way ulcer head red region scores are calculated may be adapted to, depend on, or derived from the representation format of the pixels' color. For example, ulcer scores, which are example ulcer red region scores, may be used in conjunction with the R-B-G color format. If pixels' color data is represented by cylindrical-coordinate representation formats such as the ones mentioned above (e.g., HSL, HSV, HSB, HIS, etc.), other scoring methods may be used.

White Scores

Bubbles and/or froth on the tissue surface in an in vivo body lumen may cause the area beneath the bubble/froth to appear red and/or redder than the actual color of this area, and therefore this area may be falsely identified as an ulcer red region. However, at least a portion of the perimeter of a bubble may appear white because of light reflection caused by the camera's flashing light. Therefore, in order to identify bubbles and/or froth on the tissue surface, whiteness features may be identified, for example, in an image. The identified whiteness features may, then, be used in conjunction with other image features (e.g., content related features) and with features that may be extracted from ulcer candidates, for individually evaluating ulcer candidates.

Whiteness of an image pixel's output may be characterized by high light intensity value and small differences between the color components R, G and B brightness values in this image pixel. The light intensity values may be calculated based, for example, on a weighted sum of the R, G and B brightness values. For example, in some embodiments of the present invention, light intensity values may be represented by the average of the R, G and B brightness values, wherein the R, G and B values have the same weight. Other methods may be used to represent the intensity value. For example, the intensity value may be represented by the highest brightness value among the R, G and B brightness values, or by the average between the highest brightness value and the lowest brightness value among the R, G and B brightness values. Accordingly, the whiteness score values may be calculated based on light intensity values and differences between the R, G and B brightness values, wherein a combination of high light intensity value and small differences between the R, G and B brightness values in an image area element correspond to high whiteness score value of the related image pixel. However, in case the light intensity value in the image pixel is low and/or the difference between at least one couple among the R, G and B brightness values in the image pixel is high, a low whiteness score value may be assigned to the image pixel. Accordingly, in one exemplary embodiment, the formula for determining the whiteness score value may have the following form:

$$[(R+G+B)/3]-\text{Max}\{|R-G|, |R-B|, |B-G|\}$$

wherein R, G and B are the R, G and B brightness values. As with other formulas used herein, other suitable formulas may be used. The results of the above formula may be normalized, after truncation, to a range [0-1]. The formula may have other forms which conform to the principles described herein. White scorer 226 may be configured to calculate, for any pixel's output, a score whose value depends on the whiteness of the pixel's output, hence the term 'white score'. White scorer 226 may calculate white scores within a predetermined white score range, for example [−3.0/+3.0]. In an example embodiment, the whiter a pixel is, the higher is its white score.

Content Scores

Content in the GI tract is characterized by having greenish-yellowish color. Content scorer 228 may be configured to score pixels, on individual basis, such that the content scores collectively facilitate efficient detection of content. Content scorer 228 may use a linear SVM/RBF to calculate scores for or to assign scores to pixels. Content scorer 228 may be configured to calculate, for any pixel, a score whose value may be within a predetermined score range, for example [−3.0/+3.0]. A content score may be produced by a margin classifier marking areas in images which contain content as positive examples, and areas which do not contain content as negative examples. The RGB values of these areas may be the features input to a SVM classifier, and the score that the SVM classifier generates may be the resulting soft-margins. In machine learning, 'margin classifier' is a classifier which is able to give an associated distance from a decision boundary for each example. For example, if a linear classifier is used, the distance of an example from the separating hyperplane is the margin of that example.

SVM-RBF Lookup Table

Assuming that each of the primary colors R, G, and B is represented by a value in the range [0,255], the table may include $256^3=16,777,216$ entries, where each entry stores one of the color combinations, or color permutations, {0,0,0}, {0,0,1}, {0,0,255}, ..., {255,255,255}. Since, as described herein, a pixel may be scored to obtain or determine an ulcer head score, ulcer red region score, and content score, each color permutation may be assigned three scores. For example, each color permutation may be pre-assigned an ulcer head score within a score range (e.g., [−2.5, ..., +3.5]) of ulcer head scores, an ulcer red region score within a score range (e.g., [−2.0, ..., +3.0]) of ulcer red region scores, and a content score within a score range (e.g., [−1.5, ..., +2.7]) of content scores. Table-1 below is an example SVM/RBF lookup table.

Referring to Table-1 as an example SVM/RBF lookup table, given any pixel's color (color permutation) {i,j,k} (where i, j, and k are integers), corresponding ulcer head score and ulcer red region score may be retrieved from the table. Retrieving scores for new pixels from a lookup table enables the pixels' scoring process to be faster relative to a process in which the scores have to be calculated anew for the same colors.

The content of a SVM/RBF lookup table (e.g., the various scores associated with or assigned to each of the color permutations) may be obtained or determined once, through training, for example by using training images or training data. For example, color permutation {0,0,0} may be assigned a first score value S1 (e.g., S1=−2.50) and (255,255, 255) may be assigned a second score value S2 (e.g., S2=+ 3.00), and the range of score values S1–S2 (e.g., [(−2.50)/(+ 3.0)]) may span across or distributed among the entries range (0,0,0)-(255,255,255) linearly or nonlinearly. For example, the score value S1 may be stored in an entry (0,0,0) (or in an entry corresponding to color permutation (0,0,0)), the score value S2 may be stored in entry (255,255,255) (or in an entry corresponding to color permutation (255,255,255)), and values in-between these score values (e.g., between values S1 and S2) may be stored in-between entries (0,0,0) and (255, 255,255). This way, pixels' colors/output can be assigned a score after the training process is completed.

TABLE 1

| Color (permutation) | Ulcer head scores | Ulcer red region scores |
|---|---|---|
| {0, 0, 0} | (−2.50) | (−3.00) |
| {0, 0, 1} | (−2.32) | (−2.85) |
| {0, 0, 2} | (−2.01) | (−2.22) |
| — | — | — |
| — | — | — |
| — | — | — |
| {125, 232, 251} | (−0.50) | (−0.55) |
| {125, 232, 252} | (−0.20) | (−0.31) |
| {125, 232, 253} | (+0.43) | (+0.50) |
| — | — | — |
| — | — | — |
| — | — | — |
| {254, 255, 255} | (+2.88) | (+3.44) |
| {255, 255, 255} | (+3.00) | (+3.50) |

Figure 3:
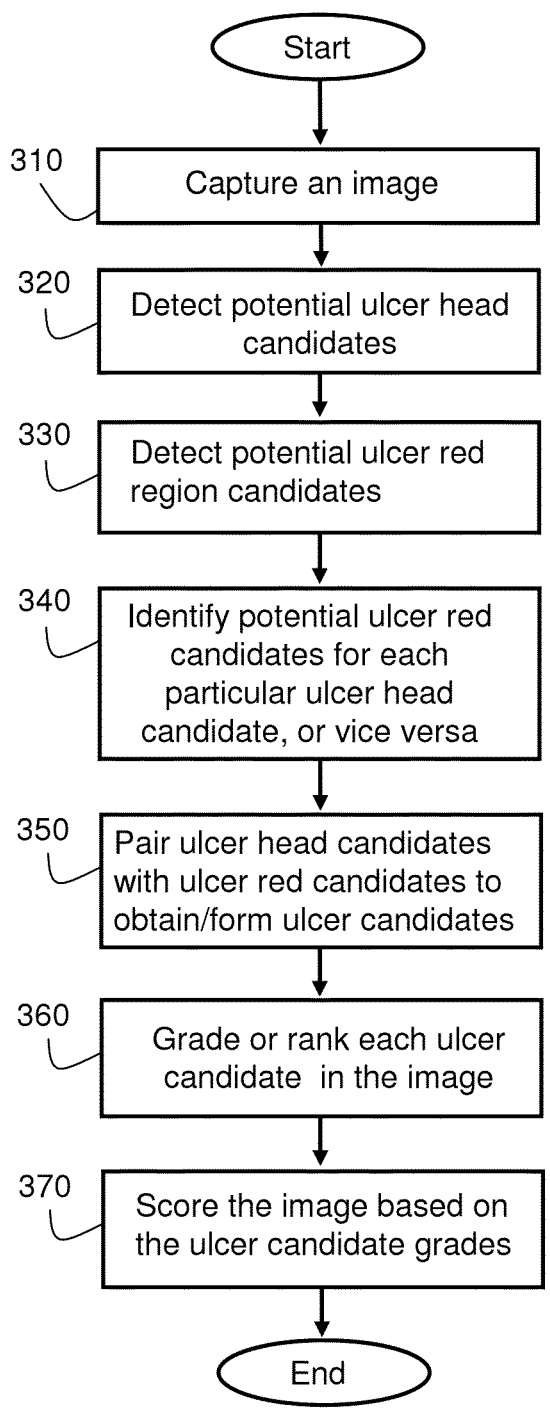
FIG. 3 is a flowchart illustration of a method for detecting ulcers according to some embodiments of the present invention.

FIG. 3 depicts a method for detecting images that are suspected as containing at least one ulcer according to an example embodiment. As with other embodiments of methods described herein, the embodiment described in FIG. 3 may be practiced with a system as shown in FIG. 1 and/or FIG. 2, but may be practiced with other systems. During operation 310, an image is captured. During operation 320, potential ulcer head candidates are detected by segmenting the image. During operation 330, potential ulcer red region candidates are detected by segmenting the image. 'Segmenting an image' means, among other things, using ulcer head scores and ulcer red region scores to identify connected components that may respectively represent ulcer heads and ulcer red regions. The segmentation process used to detect potential ulcer head candidates and potential ulcer red region candidates is described below, for example, in connection with FIGS. 5 and 6. In topology, 'connected components (of a space)' means the maximal connected subsets of a non-empty topological space. With respect to image pixels, a "connected component' may be a cluster of pixels that are 4-connected or 8-connected. In image processing and image recognition, 'pixel connectivity' is the way in which pixels in 2-dimensional images or 3-dimensional images relate to their neighbors. For example, 4-Connected pixels are neighbors to every pixel that touches one of their edges (4-connected pixels are connected horizontally and vertically), and 8-connected pixels are neighbors to every pixel that touches one of their edges or corners (8-connected pixels are connected horizontally, vertically, and diagonally).

During operation 340, ulcer red region candidates that can potentially be paired with each particular ulcer head candidate may be identified. Ulcer red region candidates may be regarded as potential ulcer red region candidates of a particular ulcer head candidate if they satisfy certain criteria or rules, for example specified herein. For example, any ulcer red region candidate that is distance-wise close enough (closer than a threshold distance) to a particular ulcer head candidate may be regarded as a potential ulcer red region candidate of that ulcer head candidate, and each ulcer head candidate may have associated with it a group of potential ulcer red region candidates. However, only one potential ulcer red region candidate from the group of potential ulcer red region candidates associated with a particular ulcer head candidate is selected for pairing with that ulcer head candidate, during operation 350. Operations 310-350 may result in zero pairs (e.g., no potential ulcer red region candidate was found for any potential ulcer head candidate), one pair, or more than one pair (e.g., 3 pairs) of ulcer head candidate and ulcer red region candidate, and each such pair may represent, form or constitute an ulcer candidate.

During operation 360, each ulcer candidate i may be graded or rated such that its grade G(i) may represent, or indicate, the probability that ulcer candidate i is an ulcer. For example, a first grade, G(1), may be calculated for a first ulcer candidate, a second grade, G(2), may be calculated for a second ulcer candidate, and so on. (The higher the grade of an ulcer candidate, the higher the probability that it is an ulcer.) During operation 370, the image may be scored or rated based on the series of grades G(1), G(2), G(3), . . . , etc. pertaining to the ulcer candidates that the image contains. The image's score ("IS") may be calculated based on, or it may be derived from or be a function of, the series of grades G(1), G(2), G(3), . . . , etc. (IS=f{G(1), G(2), G(3), . . . , G(n)}). For example, the maximum grade, Gmax, calculated for an ulcer candidate may be selected to be the image's score (IS) (e.g., IS=max{G(1), G(2), G(3), . . . , G(n)}). In other examples, the image can be assigned a relatively high score if many ulcer candidates (e.g., more than a predetermined threshold value; e.g., more than 10 ulcer candidates; e.g., 12 ulcer candidate) have been detected or identified in the image, or if only a few (e.g., 3) ulcer candidates have been detected or identified but each one of them has a relatively high grade. Other criteria may be used to score an image based on the grades of its ulcer candidates.

Figure 4:
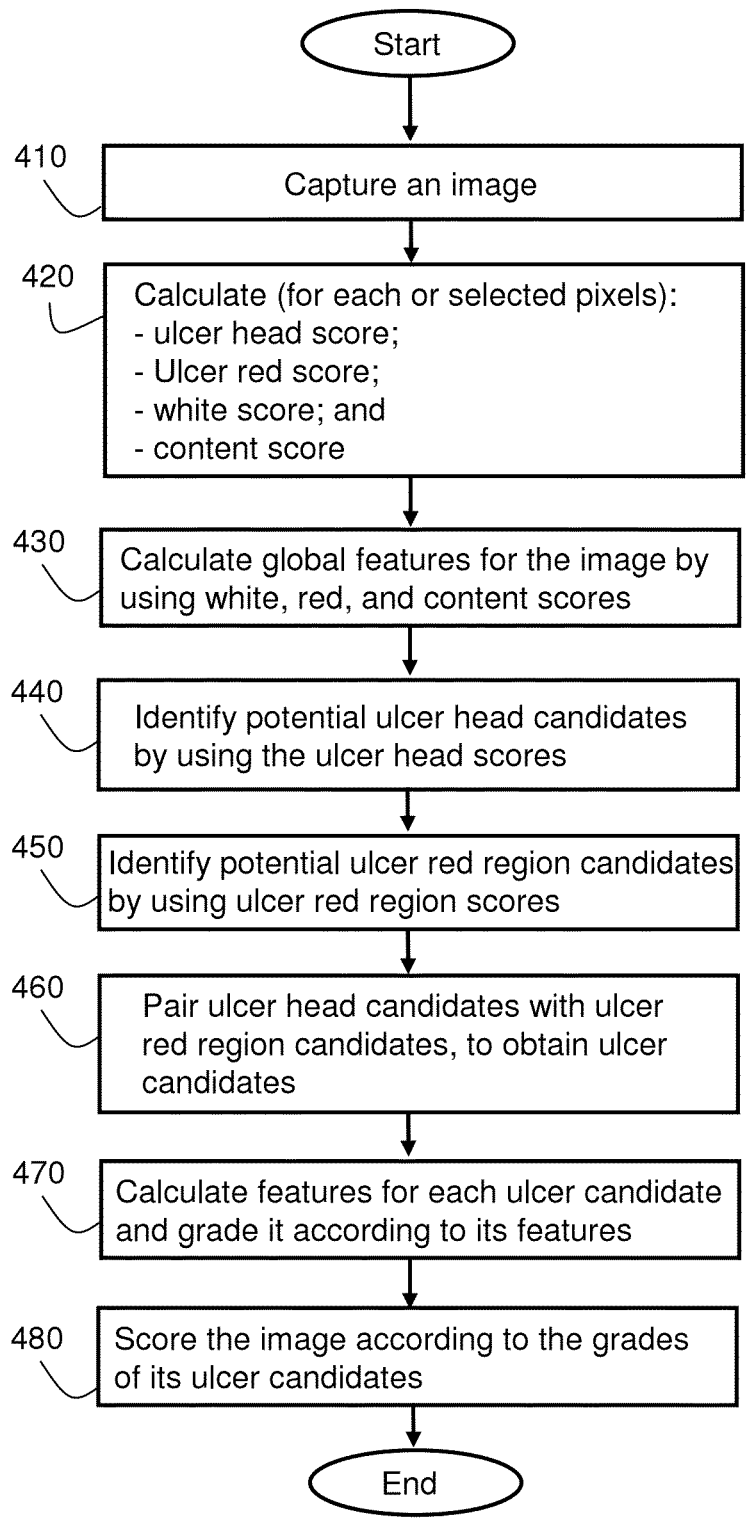
FIG. 4 is a flowchart illustration of a method for detecting ulcer candidates according to some other embodiments of the present invention.

FIG. 4 depicts a method for detecting images that are suspected to contain at least one ulcer according to an example embodiment. FIG. 4 is described in association with FIG. 1 and FIG. 2 (as with other embodiments of methods herein, other systems may be used). During operation 410, an image is captured (e.g., by using image device 40 or a similar device). During operation 420, the output signal or data 210 of each pixel, or selected pixels, may be rated or scored, for example by pixels scoring unit (PSU) 220, to obtain or determine, for example, four types of scores for each selected pixel: (1) an ulcer head score (by ulcer head scorer 222), (2) an ulcer red region score (by ulcer red region scorer 224), (3) a white score (by white scorer 226), and (4) content score (by content scorer 228). Scores of types (1) and (2) may be used to extract features (which are referred to herein as 'candidate features') from ulcer candidates, and scores of types (3) and (4) may be used to extract features (which are referred to herein as 'global features') from the entire related image. The scores may be calculated for the selected pixels and image and stored in storage unit 230, or in another storage unit, for example, by processor 280 or by another data processor.

During operation 430, processor 280, or another data processor, may selectively use stored pixel scores to calculate global features. A global feature is a feature that is calculated per image or frame, as opposed to other features (e.g., candidate features) that may be calculated per ulcer candidate. Global features, as used herein, enable estimating the cleanness degree of images in terms of the presence of bubbles, froth, and content. Global features can individually affect the grades of ulcer candidates, and therefore the score of the related images. Global features may be selected or devised such that they may enable estimating the amount and/or location of bubbles and/or content in images. An ulcer candidate may, for example, be assigned a relatively low grade if it partly or wholly overlaps with bubbles, and a relatively high grade if it does not overlap with bubbles.

Global features may be used to assign low grades to ulcer candidates if the images/pictures are mostly red (e.g. stomach images) or if they contain mostly content (e.g. colon images). Since there can be ulcers in images that are mostly red or filled with content, global features are not used to filter out potential ulcer head candidates or potential ulcer red region candidates. Namely, ulcer head candidates and ulcer red region candidates are identified in order to identify ulcer candidates, and the global features, in conjunction with features calculated for each ulcer candidate, may then be used to grade the pertinent ulcer candidates.

Global features may be directed, for example, to stomach images or frames. In that respect, global features may include, for example, a feature that may be obtained or determined by calculating, for example, the 94 percentile, 50 percentile and 40 percentile highest red scores (Other specific percentiles may be used.) For images which are all red (e.g., stomach images) these scores are higher than in comparison to images of other tissue colors. Global features may be directed, for example, to images with content, and in that respect, global features may include, for example, a feature that may be obtained by calculating the average content score in the image. For example, if most of an image contains content, the average content score would be relatively high, and the probability that there is an ulcer in such image would be relatively low. Since content and ulcer heads have similar colors, images that contain a lot of content tend to increase the probability of false alarm (e.g., content might wrongly be identified as ulcer head). Therefore, if a relatively large area of an ulcer head candidate in an image is covered with content, the overall color of the image may be taken into account when a grade is determined for the candidate.

During operation 440, ulcer head detector 246 may detect ulcer head candidates by applying one or more threshold levels (which are referred to herein as "ulcer head threshold level") to the ulcer head scores. Depending on the pixels' color, different pixels may have different ulcer head scores, and pixels whose ulcer head scores exceed a particular ulcer head threshold level, which means that these pixels have certain color characteristics corresponding to the ulcer head threshold level, may be grouped to form connected components that may represent potential ulcer head candidates. Application of an ulcer head threshold level results in a 'binary map' that divides or can be used to divide pixels into pixels whose score is higher than the threshold level and to pixels whose score is equal to or lower than the threshold level. The binary map may contain collections of pixels that may form connected components, where each connected component may be, or may represent, a candidate. Application of any ulcer head threshold level may result in (additional) one or more connected components that may represent potential ulcer head candidates, or in none. The more threshold levels are applied to the ulcer head scores, the greater the number of ulcer head candidates, and the greater the probability that an ulcer head is detected (e.g., identified in an image) because, if the image contains an ulcer, application of different threshold levels on the (same set of) ulcer head scores may generate several ulcer head candidate versions that may vary in shape and/or size, and this process increases the probability that an ulcer head version conforming to the (real) ulcer's head will be found. (The ulcer head candidate versions are also referred to herein as 'potential ulcer head candidates.)

In some embodiments, an ulcer head threshold level may be selected among a number of ulcer head threshold levels, and each ulcer head threshold level may provide additional potential ulcer head candidates. In some embodiments, the ulcer red region threshold level may be selected among a plurality of ulcer red region threshold levels, and each ulcer head threshold level may provide additional potential ulcer head candidates.

During operation 450, ulcer red region detector 242 may detect ulcer red region candidates by applying one or more threshold levels (which are referred to herein as "ulcer red region threshold level") to the ulcer red region scores. Depending on the pixels' color, different pixels may have different ulcer red region scores, and pixels whose ulcer red region scores exceed a particular ulcer red region threshold level, which means that these pixels have certain color characteristics as defined by the threshold level, may be grouped to form connected components that may represent potential ulcer red region candidates. Application of any ulcer red region threshold level may result in one or more (additional) connected components that may represent potential ulcer red region candidates, or in none. The more threshold levels are applied to the ulcer red region scores, the greater the number of ulcer red region candidates, and the greater the probability that an ulcer red region will be detected (e.g., identified in an image) because, if the image contains an ulcer, application of different threshold levels on the (same set of) ulcer red region scores may generate several ulcer red region candidate versions that may vary in shape and/or size, and this process increases the probability that an ulcer red region version conforming to the (real) ulcer's red region will be found. (The ulcer red region candidate versions are also referred to herein as 'potential ulcer red region candidates.)

With respect to steps 440 and 450, potential ulcer head candidates and/or potential red region candidates may be filtered out, not identified as candidates, removed from consideration as candidates or from the set of candidates, based on certain analysis. For example, very small potential ulcer red region candidates such as, for example, red regions which are not visible to a human eye, with or without certain vision equipment, may be excluded and/or not identified as a candidate. Additionally or alternatively, in some embodiments of the present invention, a morphological opening operation may be applied to the shape boundaries of candidates, which may, for example, remove from consideration, or from the set of candidates, very small and/or very narrow red regions, smooth shape boundaries of candidates and/or edit or alter candidates by, for example, removing small and/or narrow outward bumps from the shape boundaries and/or narrow openings in the shape boundaries. This operation may filter out, for example, very small and/or very narrow potential ulcer head candidates and/or potential ulcer red region candidates.

During operation 460, it may be checked which potential ulcer head candidate can be paired with which ulcer red region candidate. Each such pair may form an ulcer candidate. Operations 440, 450, and 460 may be executed in the order shown in FIG. 4, or in a reversed order, or in other orders. By way of example, during operation 450 a set of threshold levels may be used to obtain or determine, for example, a plurality of potential ulcer red region candidates, then during operation 440 a first threshold level may be used to find one or more potential ulcer head candidates, and, during operation 460, each of the potential ulcer red region candidates that were found during operation 450 may geometrically be checked vis-à-vis any of the potential ulcer head candidates that were found during operation 440 in order to pair each potential ulcer red region candidate with a suitable potential ulcer head candidate. Then, operation 440 may be repeated with another threshold level, to obtain other, or additional, potential ulcer head candidates, and the potential ulcer red region candidates already found during operation 450 may be checked again, this time vis-à-vis another potential ulcer head candidate, in order to pair the other potential ulcer head candidate with a suitable potential ulcer red region candidate, and so on. A suitable ulcer red region candidate may be found for a particular ulcer head candidate, and vice versa, by using suitability criteria, as described herein.

In case more than one potential ulcer red region candidate is found to be suitable for a particular potential ulcer head candidate, or more than one potential ulcer head candidate is found to be suitable for a particular potential ulcer red region candidate, a suitability value may be calculating for each potential ulcer head candidate and potential ulcer red region candidate that is suitable for the potential ulcer head candidate, or for each potential ulcer red region candidate and potential ulcer head candidate that is suitable for the potential ulcer red region candidate and, based on the suitability values, pairs may be formed, where each pair includes an ulcer head candidate and ulcer red region candidate, for example by selecting for each particular potential ulcer head candidate the potential ulcer red region candidate that is more suitable for the particular potential ulcer head candidate than the other potential ulcer red region candidates, or by selecting for each particular potential ulcer red region candidate the potential ulcer head candidate that is more suitable for the particular potential ulcer red region candidate than the other potential ulcer head candidates.

During operation 470, features, which are referred to herein as 'candidate features', may be calculated for each ulcer candidate, and a grade or rating may be determined or generated for the ulcer candidate based on, or according to, its calculated features, and, optionally, also based on, or according to, global features, as described below. During operation 480, the image may be scored or rated to form, create, or generate a score or rating for the image based on the grades formed, created or generated for its ulcer candidates. The candidate features may be divided into, for example, three groups: (1) candidate features that are calculated only based on the ulcer head candidate, (2) candidate features that are calculated only based on the ulcer red region candidate, and (3) candidate features that are calculated based on the ulcer candidate as a whole. Other groups may be used. The following features, which are divided into the three groups mentioned above, are example candidate features that are based on (calculated for, or extracted from) ulcer head candidates, or ulcer red region candidates, or from the ulcer candidate as a whole (other features may be used):

1. Features calculated for, or extracted from, the ulcer head candidate:
   A. Number of pixels in the ulcer head.
   B. Mean red score in ulcer head.
   C. Mean ulcer score in ulcer head.
2. Features calculated for, or extracted from, the ulcer red region candidate:
   A. Mean ulcer score in ulcer red.
   B. Mean white score in ulcer red.
   C. #pixels(ulcer red).
   D. Fit to ellipse and eigen-value ratio.

Feature 2D means that, given a connected component, it is determined that an ellipse that best matches the connected component is the ellipse with the same moments. A mean and covariance matrix of the connected component may be calculated, and the eigen values of the ellipse may be calculated from the inversed covariance matrix. The larger the resulting value, the more elongate the ellipse. The eigen values may be anything between infinity (e.g., in case the ellipse is a line) and 1 (in case the ellipse is a circle).

Also, the extent to which a connected component fits an ellipse may be calculated as the sum of pixels that are common to the connected component and the estimated ellipse divided by the maximum of the number of pixels of the connected component and the number of pixels within the ellipse.

3. Features calculated for, or extracted from, both ulcer head candidate and ulcer red region candidate (e.g., ulcer candidate):
   A. #pixels(ulcer head)/# pixels(ulcer red)
   B. Mean ulcer score in ulcer head/(Mean ulcer score in ulcer red+1)
   C. Mean ulcer score in not(ulcer)=ROI & not(ulcer red) & not(dilate(ulcer head)).
   D. Mean ulcer score in ulcer red/(mean ulcer score in not(ulcer))
   E. Mean and median of content in not(ulcer).

'Not(ulcer)' is defined as the pixels in the image that are extraneous to ulcer head candidates and ulcer red region candidates.
   F. Mean ulcer score in ulcer head/(mean ulcer score in not(ulcer)+1).
   G. #pixels(ulcer head & convex hull(ulcer red))/#pixels(ulcer head)
   H. #pixels(ulcer head)# pixels(fast convex hull(ulcer red))
   E. (Mean white score in ulcer head)/(Mean white score in ulcer red+1)
   I. 99 percentile of white score on ulcer perimeter, where ulcer perimeter may be calculated or obtained or defined as:

ulcer perim=dilate(ulcer red)¬(ulcer red)¬(ulcer head)

J. Mean S & V in (ulcer head I ulcer red), where S means saturation and V means value (as in the hue, saturation and value (HSV) color representation format)
   K. Mean V in ulcer head/(Mean V in ulcer red+0.01)
   L. Mean V in ulcer red/(Mean V in ulcer perimeter+0.01)

With respect to feature 2D ("Fit to ellipse and Eigen-value ratio."), ulcer red regions typically have an ellipse shape with low degree of oblongness, e.g., an aspect ratio relatively close to 1. Accordingly, shapes of ulcer red region candidates may be analyzed in order to determine the similarity of their shape to an ellipse, and the degree of oblongness of their shape. Accordingly, a correlation between the shape of an ulcer red region candidate and an ellipse shape and the oblongness (e.g. aspect ratio) of the shape of the ulcer red region candidate may be measured. For example, by computational tools, the closest ellipse shape to the shape of the ulcer red region candidate may be identified. Then, the correlation between the shape of the ulcer red region candidate and the closest ellipse shape, and the aspect ratio of the closest ellipse shape, may be calculated. In general, the higher the correlation between the shape of an ulcer red region candidate and the closest ellipse shape is, the higher the probability is that the ulcer red region candidate is an ulcer red region. Additionally, as the aspect ratio of the closest ellipse shape is closer to 1, the probability that the ulcer red region candidate is an ulcer red region may be higher.

With respect to feature 3E ("Mean and median of content in not(ulcer)."), it is typical in ulcers that the ulcer head is fully or partly circumscribed by inflamed red tissue, and most of the ulcer head's area reside in the convex hull of the ulcer red region. Feature 3E measures this property. Feature 3F ("Mean ulcer score in ulcer head/(mean ulcer score in not(ulcer)+1) ."), measures the ratio between the number of ulcer head candidate pixels and the number of pixels of the related convex hull (ulcer red region candidate).

Figures 5, 6:
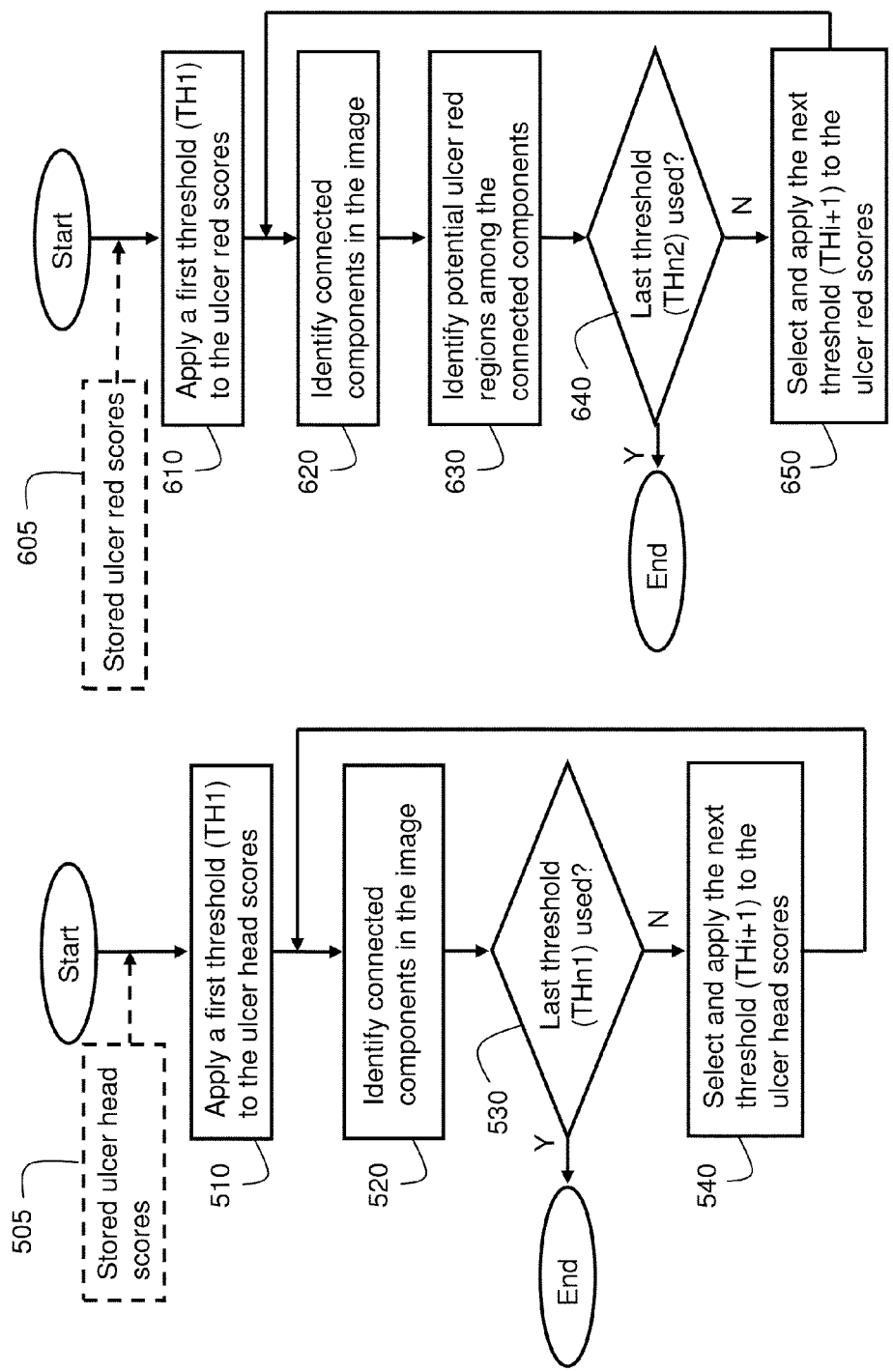
FIG. 5 is a flowchart illustration of a method for detecting ulcer head candidates according to embodiments of the present invention.
FIG. 6 is a flowchart illustration of a method for detecting ulcer red region candidates according to embodiments of the present invention.

FIG. 5 is a flowchart of a method for detecting ulcer head candidates according to an example embodiment. Assume that an image is captured and corresponding ulcer head scores (UHSs) are stored (at step 505) in, and retrievable from, a corresponding ulcer head score (URS) lookup table. Also assume that a first number (n1; e.g., n1=13) of predefined threshold levels designated as TH1, TH2, . . . THi, . . . , THn1, is used to identify potential ulcer head candidates.

As explained herein, ulcer head scores are devised (e.g., their range is set and, during a training process, particular ulcer red region scores are respectively assigned to particular colors) such that they enable making ulcer heads conspicuous relative to the rest of the image, and in particular relative to ulcer red regions. The group of ulcer head scores (UHSs) obtained for a given image, for example by calculation, derivation (e.g., by interpolating or extrapolating from other UHS scores), or retrieval (e.g., from the UHS lookup table), may have different values within a predetermined ulcer head score range, which is referred to herein as the "UHS range". Depending on which ulcer head scores pass each threshold level, application of different thresholds levels on the UHSs may result in UHSs forming different connected components. That is, applying different threshold levels on the UHSs may result in different connected components. Depending on their geometrical or morphological characteristics (e.g., size, shape, etc.), one or more of the connected components may represent potential ulcer head candidates, while other connected components may represent something else (e.g., noise; e.g., content, bubbles, froth, etc.). It may occur, though, that none of the connected components represents any potential ulcer head candidate. The UHS range may generally be [−R1, . . . , 0, . . . , +R2], where R1 and R2 may be positive numbers. In one embodiment, the closer the pixel's color to white or yellowish-white, the lower its UHS value. In another embodiment, the closer the pixel's color to white or yellowish-white, the higher its UHS value. The UHS range may be, for example, [−4.2/+5.1], [−5.0/+5.0], [−3.0/+3.0], etc.

During operation 510, a first threshold (TH1) of the n1 threshold levels may be applied to the UHSs and, during operation 520, one or more connected components may be identified/found in the image based on the UHSs that pass the threshold level. During operation 530, if there is another threshold level, THi, that has not been used yet (the condition being shows as 'N' at step 530), the next threshold level, THi+1, may be applied, during operation 540, to the UHSs, and, as a result of this, additional connected components may be obtained, identified or found during operation 520, and so on; e.g., the process of obtaining or identifying connected components (e.g., during operations 520, 530 and 540) may loop or iterate until the last threshold level is reached. If the used threshold level, THi, is the last one (e.g., THi=THn1, or i=n1) (the condition being shown as 'Y' at operation 530), the process may be terminated because every connected component that can possibly be obtained or found by using the n1 threshold levels has been found, analyzed and considered. Some of the connected components obtained or found by using operations 510 through 540 may represent potential ulcer head candidates. Therefore, each connected component may be further analyzed, as described below, in order to determine whether the ulcer head candidate it may represent qualifies as a potential ulcer head candidate. Briefly, a potential ulcer head candidate may qualify as an ulcer head candidate if a suitable ulcer red region candidate can be found for it, for example, in the way described herein, for example in connection with FIG. 6. Threshold levels may be applied to the ulcer head scores (UHSs), for example, from a lowest ordered level to a highest ordered level, or vice versa. However, the order in which threshold levels may be applied to the UHSs is insignificant.

FIG. 6 is a flowchart of a method for detecting ulcer red candidates according to an example embodiment. Assume that an image is captured and corresponding ulcer red region scores (URSs) are stored (during operation 605) in, and retrievable from, a corresponding ulcer red region score (URS) lookup table. Also assume that a second number (n2; e.g., n2=18) of predefined threshold levels designated as TH1, TH2, . . . THi, . . . , THn2 (where n2 may be equal to, less than n1, or greater than n1) is used to identify potential ulcer red candidates.

As explained above, ulcer red region scores are devised (e.g., their range is set and, during a training process, particular ulcer red region scores are assigned to particular colors) such that they enable making ulcer red regions in the image visually conspicuous relative to the rest of the image, and in particular, relative to ulcer heads. The group of ulcer red scores (URSs) obtained for a given image, for example by calculation, derivation (e.g., by interpolating or extrapolating other URS scores), or retrieval (e.g., from an URS lookup table), may have different values within a predetermined ulcer red region score range, which is referred to herein as the "URS range". Therefore, depending on which ulcer red region scores pass each threshold level, application of different threshold levels on the URSs may result in URSs forming different connected components. Depending on their geometrical or morphological characteristics (e.g., size, shape, etc.), one or more of the connected components may represent potential ulcer red region candidates. It may occur, though, that none of the connected components represents a potential ulcer red region candidate. The URS range may generally be [−R11, . . . , 0, . . . , +R12], where R11 and R12 may be positive numbers. By way of example, the closer the pixel's color to red, the lower its URS value. By way of another example, the closer the pixel's color to red, the higher its URS value. The URS range may be, for example, [−4.2/+5.1], [−5.0/+5.0], [−3.0/+3.0], etc.

During operation 610, a first threshold (TH1) of the n2 (e.g., n2=18) threshold levels may be applied to the URSs pertaining to the image and, during operation 620, one or more connected components may be identified or found in the image based on the URSs that pass the first threshold, TH1. During operation 630, the identified connected component(s) may be processed and/or analyzed in order to check whether any of them is, or represents, a potential ulcer red region candidate. A connected component, which is identified by applying a threshold level to the pertinent URSs, may be determined to be a potential ulcer red region if the connected component has certain morphological characteristics, or if it satisfies certain morphological criteria. For example, the morphological criteria may be related to the geometrical characteristics of a potential ulcer head candidate. That is, a particular connected component that is identified in the URSs (by applying any threshold level) may be determined to be, or to represent, a potential ulcer red region candidate only if it can be morphologically-wise paired with a potential ulcer head candidate. In one embodiment, a connected component may be determined to be, or to represent, a potential ulcer red region candidate with respect to one, specific, potential ulcer head candidate, but not with respect to other potential ulcer head candidates. In another embodiment, a connected component may be determined to be, or to represent, a potential ulcer head candidate with respect to one, specific, potential ulcer red region candidate, but not with respect to other potential ulcer red region candidates. The determination, with respect to the specific potential ulcer head candidate and the specific potential ulcer red region candidate, may be based on suitability criteria; namely, only connected components that satisfy the suitability criteria may be regarded as ulcer red region candidates, or as ulcer head candidates, depending on the embodiment. Below is an example suitability criteria that, by way of example, includes two criterions (other suitability criteria may be used, and various combinations may be used):

a) Head perimeter overlapping ("HPO") criterion, which indicates the extent of overlap between the perimeter of the connected component (or the potential ulcer red region candidate represented by it) and the perimeter of a potential ulcer head. A pair of potential ulcer head candidate and a potential ulcer red region candidate may be regarded as mutually satisfying the HPO criterion if a HPO value calculated for them is between a first value, P1[%] and a second value, P2[%]. For example, P1 may be equal to 10%, and P2 may be equal to 84%. This type of overlapping refers to, or indicates, the percentage of the perimeter of a potential ulcer head candidate that overlaps the perimeter of a potential ulcer red region candidate, or is contained in the area of the potential ulcer red region candidate. A HPO value may be calculated for all, or for selected, potential ulcer red region candidates. Other percentages may be used. (P1 and P2 are the percentages of pixels in the ulcer red region candidate that are in the ulcer head candidate perimeter, where the ulcer head candidate perimeter may be derived by morphologically expanding the ulcer head candidate.)

b) Head area overlapping ("HAO") criterion, which indicates the extent of overlap between the area of the connected component (or the potential ulcer red region candidate represented by it) and the area of a potential ulcer head. A pair of potential ulcer head candidate and a potential ulcer red region candidate may be regarded as mutually satisfying the HAO criterion if a HAO value calculated for them is less than a third value, P3[%]. For example, P3 may be equal to 10%. Other percentages may be used. This type of overlapping refers to, or means, the percentage of the area of a potential ulcer head candidate that overlaps the area of a potential ulcer red region candidate that is represented by the connected component. A HAO value may be calculated for all, or for selected, potential ulcer red region candidates.

Using suitability criteria such as suitability criterions a) and b) above provides for some overlapping tolerance between potential ulcer head candidates and ulcer red region candidates in order to accommodate for various types and sizes of ulcers, or ulcer variance. A pair of potential ulcer head candidate and potential ulcer red region candidate may be regarded as (they may qualify as) an ulcer candidate if it satisfies both criteria a) and b). Other sets of criteria may be used.

If, after applying/using all the n2 thresholds on the URSs, it is determined that none of the connected component satisfies the suitability criteria (e.g., suitability criteria a) and b) above) with respect to a particular potential ulcer head candidate, that particular potential ulcer head candidate may be regarded as an ineligible ulcer head candidate (and, therefore, it may be ignored). However, it may occur that more than one connected components, or the potential ulcer red region candidates that they represent, satisfy the suitability criteria with respect to a same particular potential ulcer head candidate, in which case these potential ulcer red region candidates may become, or regarded as, (eligible) ulcer red regions candidates, among which only one ulcer red region candidate may be determined to be the more suitable one for pairing with the ulcer head candidate.

A suitability rating or value, Sv, may be calculated for each potential ulcer red region candidate, or for selected potential ulcer red region candidates, for a particular potential ulcer head candidate by applying a suitability formula (e.g., suitability formula (I)) on the pertinent overlapping values (e.g., HAO and HPO), and a pairing rule, P.R. (e.g., pairing rule (2) below), may be used to find a potential ulcer red region candidate that is suitable for the particular potential ulcer head candidate, based on the calculated suitability values. Other formulas may be used.

$$Sv = \{HAO + |HPO - 0.62|\} \quad (1)$$

$$P.R. = Min\{Sv1, Sv2, \ldots, Svk\} \quad (2)$$

where k is the number of potential ulcer red region candidates that are obtained by using threshold levels, as described above, and $Svi$ is the suitability value calculated for potential ulcer red region candidate i (PURRi).

EXAMPLE

In one example, if three connected components, designated as CC1, CC2, and CC3, which respectively represent three potential ulcer red region candidates PURR1, PURR2, and PURR3, are sufficiently close to a particular potential ulcer head candidate, UHC1, overlapping values may be calculated for each of potential ulcer red region candidates PURR1, PURR2, and PURR3 with respect to the potential ulcer head candidate UHC1. By way of example, the overlapping values, {HAOs/HPOs}, respectively calculated for potential ulcer red region candidates PURR1, PURR2, and PURR3 are {0.02/0.08}, {0.07/0.30}, and {0.09/0.75}. Assuming that the suitability criterions a) and b) above are applied with P1, P2 and P3 respectively being 0.1, 0.84 and 0.1, potential ulcer red region candidate PURR1 does not satisfy the HPO criterion because its overlapping value is equal to 0.08, which is not in the permitted example HPO range [0.1-0.84]. Therefore, potential ulcer red region candidate PURR1 may be ignored and the pairing rule (e.g., pairing rule (2)) not applied to it. Since potential ulcer red region candidates PURR2 and PURR3 satisfy the suitability criteria (their respective overlapping values {0.07/0.30} and {0.09/0.75} satisfy both suitability criterions a) and b), they may be subjected to the pairing rule. In order to determine which one of the potential ulcer red region candidates PURR2 and PURR3 mentioned above is suitable for the potential ulcer head candidate for which the overlapping values {0.07/0.30} and {0.09/0.75} were calculated, the respective suitability values may be calculated by applying suitability formula (I) to the related overlapping values:

$$Sv_{PURR2} = \{0.07 + |0.30 - 0.62|\} = 0.07 + 0.32 = 0.39$$

$$Sv_{PURR3} = \{0.09 + |0.75 - 0.62|\} = 0.09 + 0.13 = 0.22$$

Since in this example $Sv_{PURR3} < Sv_{PURR2}$ (0.22<0.39), potential ulcer red region candidate PURR3 may be regarded as the potential ulcer red region candidate that is more suitable for the ulcer head candidate than potential ulcer red region candidate PURR2, which makes potential ulcer red region candidate PURR3 an ulcer red region candidate. Other suitability formulas and/or pairing rules may be used to calculate or evaluate the suitability of potential ulcer red region candidates to potential ulcer head candidates, and to select a more suitable ulcer red region candidate from the potential ulcer red region candidates. Using a suitability formula and a pairing rule, as exemplified herein, enables detection of ulcer candidates that are more likely to be ulcers. The ulcer candidates may be further evaluated (e.g., by analyzing geometrical features thereof) in order to identify ulcer candidates that are statistically significant.

During operation 640, if there is another threshold level, THi, that has not been applied/used yet (the condition being shows as 'N' at step 640), the next threshold level, THi+1, may be selected and applied, during operation 650, to the URSs, and, as a result of this, additional connected components may be obtained, found or identified during operation 620, processed during operation 630, and so on; e.g., the process of obtaining or identifying connected components (e.g., during operations 620, 630, 640 and 540) may loop or iterate until the last threshold level is reached. If the applied threshold level, THi, is the last one (e.g., THi=THn2, or i=n2) (the condition being shows as 'Y' during operation 640), the process may be terminated because every connected component that can possibly be identified or detected in the image by using the set of n2 threshold levels has been processed, analyzed and considered.

The connected components found or identified by using the steps 610 through 650 represent potential ulcer red region candidates. Therefore, each connected component may be further analyzed, as described, in order to determine whether the potential ulcer red region candidate it represents qualifies as an ulcer red region candidate. Briefly, a potential ulcer red region candidate may qualify as an ulcer red region candidate if it suits a potential ulcer head candidate, or if a suitable ulcer head candidate can be found for it, for example, in the way described herein, for example in connection with FIG. 6. Threshold levels may be applied to the ulcer red scores (URSs), for example, from a lowest ordered level to a highest ordered level, or vice versa. However, the order in which threshold levels are applied to the URSs is insignificant.

Figure 7:
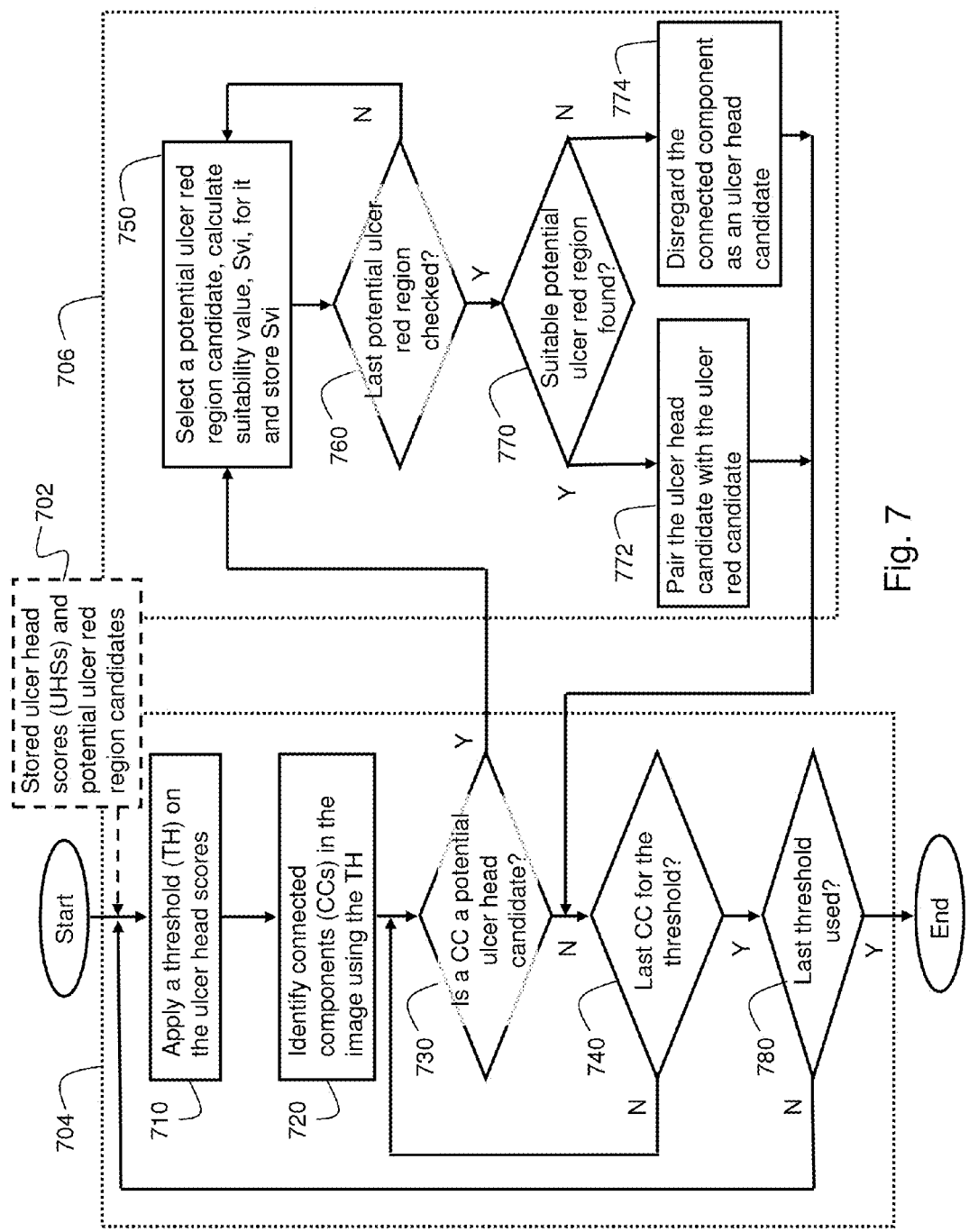
FIG. 7 is a flowchart illustration of a method for detecting ulcer candidates according to yet some other embodiments of the present invention.

FIG. 7 is a flowchart of a method for detecting ulcer candidates according to an example embodiment. An ulcer candidate may be formed by, or may includes, a pair including an ulcer head candidate and an ulcer red region candidate that is associated with it. A pair of ulcer head candidate and ulcer red region candidate may include an ulcer head candidate and an ulcer red region candidate that is found to be more suitable for it than other ulcer red region candidates, or an ulcer red region candidate and an ulcer head candidate that is found to be more suitable for it than other ulcer head candidates. FIG. 7 illustrates a method for pairing or grouping a suitable ulcer red region candidate with an ulcer head candidate.

Assume that an image is captured and ulcer head scores (UHSs) pertaining to the image are stored (at 702) in, and retrievable from, a corresponding ulcer head score (UHS) lookup table. Also assume that potential ulcer red region candidates that were found in the image (or data representing these candidates) are stored (at step 702) in a storage unit, and that the n1 threshold levels TH1, . . . , THn1 mentioned above are used, as an example, to identify ulcer head candidates. As explained above, an ulcer red region candidate is initially regarded as a potential candidate when the connected component that represents it is first identified in the image (see, for example, steps 620 and 630 in FIG. 6). A potential ulcer red region candidate becomes, or can be regarded as, an ulcer red region candidate if it satisfies the suitability criteria (e.g., suitability criteria (1)) described above. Block 704 generally identifies potential ulcer head candidates. Block 706 generally pairs potential ulcer red region candidates with potential ulcer head candidates.

During operation 710, a first threshold level, TH, is applied to the stored UHSs in order to identify, in the image, connected components (CCs) that may represent potential ulcer head candidates, and during operation 720 zero, one, or more than one connected components may be identified in the image as a result of the application of the threshold. Since an identified connected component may represent something other than an ulcer head, for example, because of it being too small, too large, or too thin, the connected component may be processed (e.g., masked) and/or evaluated, during operation 730, to determine whether it is likely to represent a potential ulcer head candidate. If the connected component qualifies as representing a potential ulcer head candidate (the condition being shown as "Y" at operation 730), it is checked, during operations 750, 760 and 770, whether any of the stored potential ulcer red region candidates can be paired with the potential ulcer head candidate.

During operation 750, a potential ulcer red region candidate may be selected among the stored potential ulcer red region candidates, and a suitability value, Sv, which represents or indicates suitability of the potential ulcer red region candidate to the potential ulcer head candidate, may be calculated by a suitability formula or function (e.g., suitability formula (1)), or otherwise determined. Then (still at step 750), the suitability calculation result (e.g., suitability value Sv) may be stored, for example, to enable comparing it to other suitability values that may likewise be calculated for the other potential ulcer red region candidates with respect to the same potential ulcer head candidate.

During operation 760 it is checked whether the potential ulcer red region candidate selected during operation 750 is the last potential ulcer red region candidate that was considered. If the potential ulcer red region candidate selected during operation 750 is not the last potential ulcer red region candidate considered (the condition is shown as "N" at operation 760), operations 750 and 760 may be repeated, iterated or looped with respect to another stored potential ulcer red region candidate; e.g., the process of evaluating potential ulcer red region candidates for a respective potential ulcer head candidate (e.g., during operation 750) may loop or iterate until all, or selected, potential ulcer red region candidates are evaluated vis-à-vis the respective potential ulcer head candidate. However, if the potential ulcer red region candidate selected during operation 750 is the last potential ulcer red region candidate considered (the condition is shown as "Y" at operation 760), a pairing rule (e.g., pairing rule (2)) may be applied, during operation 770, to suitability values that were calculated during operation 750 for (the) potential ulcer red region candidates, in order to determine if any of them can be paired with (is suitable for) the potential ulcer head candidate found during operation 730. The pairing rule may not be applied to suitability values that do not satisfy the suitability criteria.

During operation 770 it is also checked whether, based on the calculated suitability values and applied pairing rule, any of the potential ulcer red region candidates can be paired with the potential ulcer head candidate. If a particular potential ulcer red region candidate is found, which can be paired with the potential ulcer head candidate (the condition being shown as "Y" at operation 770), the particular potential ulcer red region candidate is paired, during operation 772, with the potential ulcer head candidate. However, if none of the potential ulcer red region candidates can be paired with the potential ulcer head candidate (the condition being shown as "N" at operation 770), the connected component representing that potential ulcer head candidate may be disregarded or ignored, at operation 774.

If, per operation 730, the connected component does not qualify as representing a potential ulcer head candidate (the condition being shown as "N" at operation 730), in which case the connected component is ignored, or, per block 706, after a potential ulcer head candidate is either paired with a corresponding ulcer red region candidate or ignored for not likely to be an ulcer head candidate, it is checked, at operation 740, whether there is an additional connected component, which was found for the particular threshold level, that has not been processed by block 706 yet. If there is such a connected component (the condition being shown as "N" at operation 740), it is processed and evaluated at operation 730 in the way described above. However, if there is no such connected component (the condition being shown as "Y" at operation 740), it is checked, during operation 780, whether there is another threshold level for which zero, one, or more than one additional connected components may be obtained/found. If there is such a threshold level (the condition being shown as "N" at operation 780), it is applied, at operation 710, in order to identify additional connected components. However, if there is no such threshold level (the condition being shown as "Y" at operation 780), the ulcer head-ulcer red region pairing process may be terminated, and the resulting ulcer candidates, which have been obtained by pairing ulcer head candidates with ulcer red region candidates, may be graded, as described below, in order to form, create, or generate a grade indicative of the probability of each ulcer candidate to be a genuine ulcer. The process of obtaining connected components that may represent potential ulcer head candidates, identifying suitable potential ulcer red region candidates for potential ulcer head candidates, and respectively pairing potential ulcer head candidates with potential ulcer red region candidates (e.g., during operations 710, 720, 730, block 706, and operations 740 and 780, or during operations 710, 720, 730, 740, and 780) may loop or iterate until all the threshold levels to be applied to the ulcer head scores are applied.

Figure 8A:
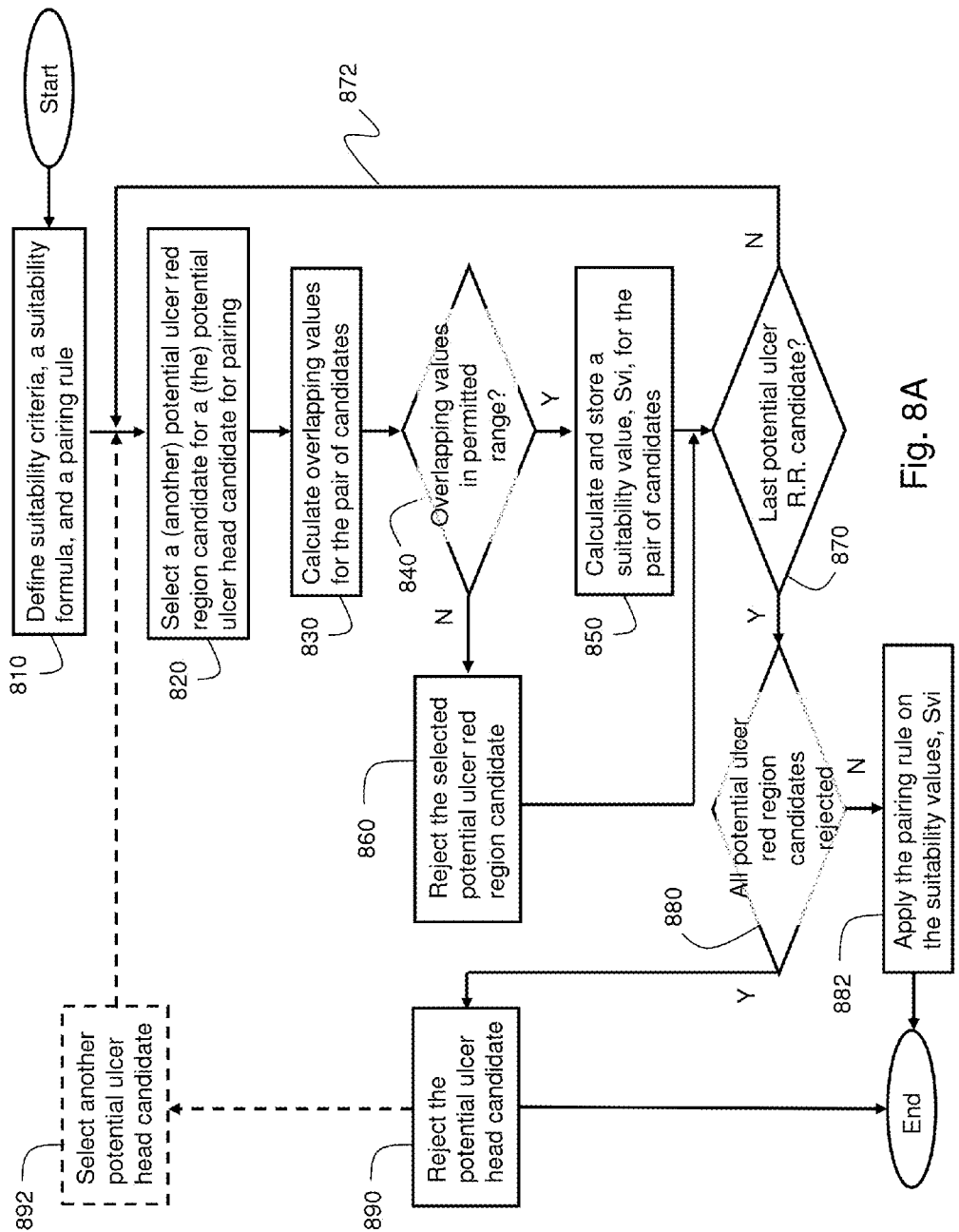
FIG. 8A is a flowchart illustration of a method for identifying an ulcer red region candidate for a given ulcer head candidate according to embodiments of the present invention.

FIG. 8A is a flowchart of a method for identifying an ulcer red region candidate, in potential ulcer red region candidates, for a particular ulcer head candidate according to some embodiments. During operation 810, suitability criteria, a suitability formula, and a pairing rule may be defined. Assume that the suitability criteria include overlapping criteria (e.g., HAO, HPO) and the suitability formula uses overlapping values that may be calculated based on the overlapping criteria. Also assume that a potential ulcer head candidate is selected, for which a suitable ulcer red region candidate is to be found among a group of stored potential ulcer red region candidates. The potential ulcer red region candidates whose suitability to a particular ulcer head candidate is to be evaluated, may be selected for the evaluation, for example, according to, or based on, their distance from the particular ulcer head candidate. For example, only potential ulcer red region candidates that are close enough to the particular ulcer head candidate may be factored in and their suitability evaluated. (As explained herein, a potential ulcer head candidate may be ignored altogether if no suitable ulcer red region candidate is found for it, or, if such an ulcer red region candidate is found for it, the potential ulcer head candidate may be regarded as an ulcer head candidate.)

During operation 820, a particular potential ulcer red region candidate may be selected from the group of stored potential ulcer red region candidates in order to evaluate the particular potential ulcer red region candidate in terms of suitability to the potential ulcer head candidate, for example in terms of overlapping. During operation 830, overlapping values (e.g., HAO and HPO) may be calculated for the particular potential ulcer red region candidate and the potential ulcer head candidate, which are referred to in the flowchart as "pair of candidates". (The overlapping values may be calculated, for example, by using morphological tools.) During operation 840, it is checked whether each of the overlapping values calculated for the particular pair of candidates is within a permitted range. If all the overlapping values calculated for the pair of candidates are respectively within the permitted ranges, which means that the pair of candidates satisfies the suitability criteria (the condition being shown as "Y" at operation 840), then, during operation 850, a suitability value, Sv1, may be calculated and stored for the pair of candidates, for example by using the predefined suitability formula, for example based on the calculated overlapping values. However, if one or more of the overlapping values calculated for the pair of candidates is/are not within the permitted ranges, which means that the particular pair of candidates does not satisfy the suitability criteria (the condition being shown as "N" at operation 840), then, during operation 860, the (evaluated) potential ulcer red region candidate may be ignored for being unsuitable for the particular potential ulcer head candidate.

During operation 870, it is checked whether the potential ulcer red region candidate selected at operation 820 and processed at operation 830 is the last potential ulcer red region candidate in the group of potential ulcer red region candidates related to the particular potential ulcer head candidate. If there are additional potential ulcer red region candidates in the group of potential ulcer red region candidates related to the particular potential ulcer head candidate that have not yet been selected and processed (the condition is shown as "N" at operation 870), another potential ulcer red region candidate may likewise be selected during operation 820, and processed at operation 830. Depending on the overlapping values calculated for the other potential ulcer red region candidate, the other potential ulcer red region candidate may be rejected (ignored), as per operation 860, or a suitability value, Sv2, may be calculated and stored for it. Processing iteration or loop 872 may be repeated until all the potential ulcer red region candidates pertaining to the particular potential ulcer head candidate are selected (at operation 820) and processed (at operation 830). If all the potential ulcer red region candidates have been evaluated (the condition is shown as "Y" at operation 870), then it is checked, at operation 880, whether all the potential ulcer red region candidates have been rejected/ignored. If all the potential ulcer red region candidates are rejected/ignored (the condition is shown as "Y" at operation 880), this may indicate that the particular potential ulcer head candidate is not an eligible ulcer head candidate, for which reason it may also be rejected/ignored, at operation 890. However, if one or more potential ulcer red region candidates are not rejected/ignored (the condition is shown as "N" at operation 880), which means that suitability value(s) was/were calculated for it/them, then, at operation 882, the pairing rule (e.g., pairing rule (2)) may be applied to all, or to selected, suitability values in order to determine which one of the non-rejected potential ulcer red region candidates better suits the particular ulcer head candidate. In general, the more a potential ulcer red region candidate suits a potential ulcer head candidate, the higher the probability of the resulting ulcer candidate being a genuine ulcer. After a suitable ulcer red region candidate is found for the particular potential ulcer head candidate, or after the particular potential ulcer head candidate is rejected for lacking a suitable ulcer red region candidate, another potential ulcer head candidate may be selected, at operation 892, for which an ulcer red region candidate may be found in the way described above.

Figure 8B:
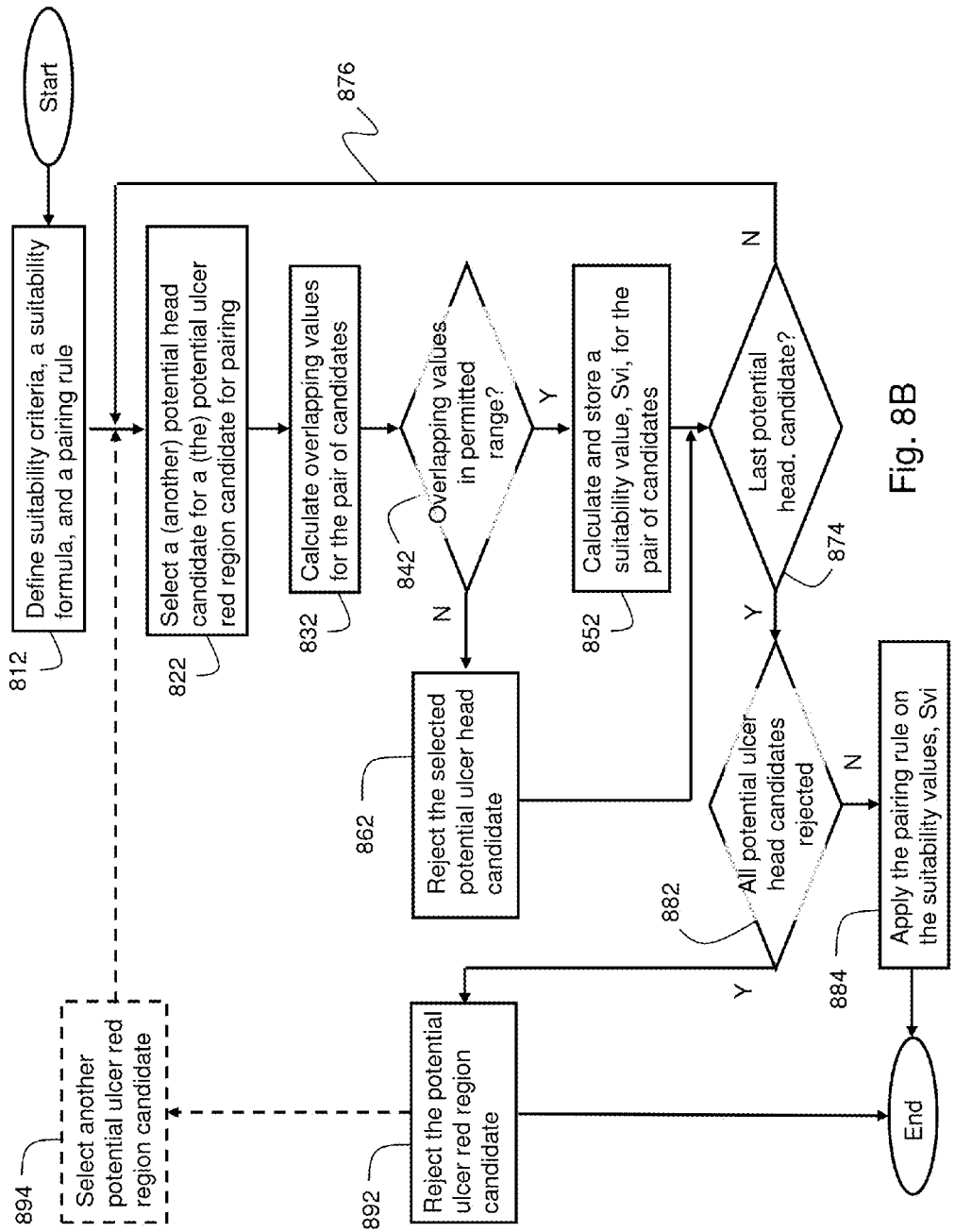
FIG. 8B is a flowchart illustration of a method for identifying an ulcer head candidate for a given ulcer red region candidate according to embodiments of the present invention.

FIG. 8B is a flowchart of a method for identifying an ulcer head candidate, in potential ulcer head candidates, for a particular ulcer red region candidate according to some other embodiments. During operation 812, suitability criteria, a suitability formula, and a pairing rule may be defined. Assume that the suitability criteria include overlapping criteria (e.g., HAO, HPO) and the suitability formula uses overlapping values that may be calculated based on the overlapping criteria. Also assume that a potential ulcer red region candidate is selected, for which a suitable ulcer head candidate is to be found among a group of stored potential ulcer head candidates. The potential ulcer head candidates whose suitability to a particular ulcer red region candidate is to be evaluated, may be selected for the evaluation, for example, according to, or based on, their distance (e.g., a few millimeters, or a distance measured as percentage of the image's overall length or diameter) from the particular ulcer red region candidate. For example, only potential ulcer head candidates that are close enough (e.g., they are less than 5 millimeters, or less than 20% of the image's overall length or diameter) to the particular ulcer red region candidate may be factored in (e.g., their suitability may be evaluated). (A potential ulcer red region candidate may be ignored altogether if no suitable ulcer head candidate is found for it, or, if such an ulcer head candidate is found for it, the potential ulcer red region candidate may be regarded as an ulcer red region candidate.)

During operation 822, a particular potential ulcer head candidate may be selected from the group of stored potential head region candidates in order to evaluate the particular potential ulcer head candidate in terms of suitability to the potential ulcer red region candidate, for example in terms of overlapping. During operation 832, overlapping values (e.g., HAO and HPO) may be calculated for the particular potential ulcer head candidate and the potential ulcer red region candidate, which are referred to in the flowchart as "pair of candidates". (The overlapping values may be calculated, for example, by using morphological tools.) During operation 842, it is checked whether each of the overlapping values calculated for the particular pair of candidates is within a permitted range. If all the overlapping values calculated for the pair of candidates are respectively within the permitted ranges, which means that the pair of candidates satisfies the suitability criteria (the condition being shown as "Y" at operation 842), then, at operation 852, a suitability value, Sv1, may be calculated and stored for the pair of candidates, for example by using the predefined suitability formula, for example based on the calculated, or otherwise determined overlapping values. However, if one or more of the overlapping values calculated, or determined, for the pair of candidates is/are not within the permitted ranges, which means that the particular pair of candidates does not satisfy the suitability criteria (the condition being shown as "N" at operation 840), then, at operation 862, the (evaluated) potential ulcer head candidate may be ignored for being unsuitable for the particular potential ulcer red region candidate.

During operation 874, it is checked whether the potential ulcer head candidate selected at operation 822 and processed at operation 832 is the last potential ulcer head candidate in the group of potential ulcer head candidates related to the particular potential ulcer red region candidate. If there are additional potential ulcer head candidates in the group of potential ulcer head candidates related to the particular potential ulcer red region candidate that have not yet been selected and processed (the condition is shown as "N" at operation 874), another potential ulcer head candidate may likewise be selected at operation 822, and processed at operation 832. Depending on the overlapping values calculated for the other potential ulcer head candidate, the other potential ulcer head candidate may be rejected (ignored), as per operation 862, or a suitability value, Sv2, may be calculated and stored for it. Processing iteration or loop 876 may be repeated until all the potential ulcer head candidates pertaining to the particular potential ulcer red region candidate are selected (at operation 822) and processed (at operation 832). If all the potential ulcer head candidates have been evaluated (the condition is shown as "Y" at operation 872), then it is checked, at operation 882, whether all the potential ulcer red region candidates have been rejected/ignored. If all the potential ulcer head candidates are rejected/ignored (the condition is shown as "Y" at operation 882), this may indicate that the particular potential ulcer red region candidate is not an eligible ulcer red region candidate, for which reason it may also be rejected/ignored, at operation 892. However, if one or more potential ulcer head candidates are not rejected/ignored (the condition is shown as "N" at operation 882), which means that suitability value(s) was/were calculated for it/them, then, at operation 884, the pairing rule (e.g., pairing rule (2)) may be applied to all, or to selected, suitability values in order to determine which one of the non-rejected potential ulcer head candidates better suits the particular potential ulcer red region candidate.

In general, the more a potential ulcer head candidate suits a potential ulcer red region candidate, the higher the probability of the resulting ulcer candidate being an ulcer. After a suitable ulcer head candidate is found for the particular potential ulcer red region candidate, or after the particular potential ulcer red region candidate is rejected for lacking a suitable ulcer head candidate, another potential ulcer red region candidate may be selected, at operation 894, for which a suitable ulcer head candidate may be found in the way described above.

Execution of FIG. 8A (or FIG. 8B, depending on the used embodiment) may result in zero, one, or more than one pairs of ulcer head candidates and suitable ulcer red region candidates, where each such pair makes an ulcer candidate. In order to evaluate the probability that a particular ulcer candidate is an ulcer, the ulcer candidate may be evaluated, for example, as described below. In order to evaluate an ulcer candidate, various morphological/geometrical features may be extracted there from and compared correlated, for example, to features that are known as typical to ulcers.

Figure 9B:
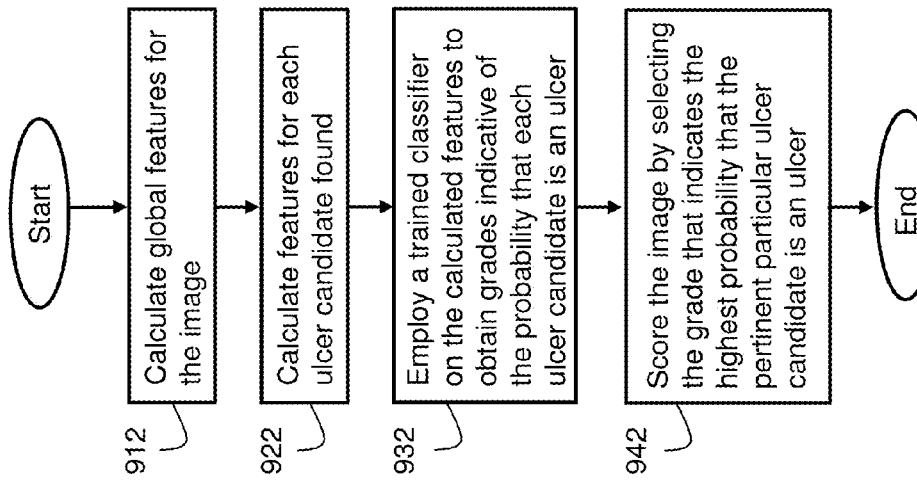
FIG. 9A-9B are flowchart illustrations of a method for scoring an image that contains one or more ulcer candidates according to embodiments of the present invention.
Figure 9A:
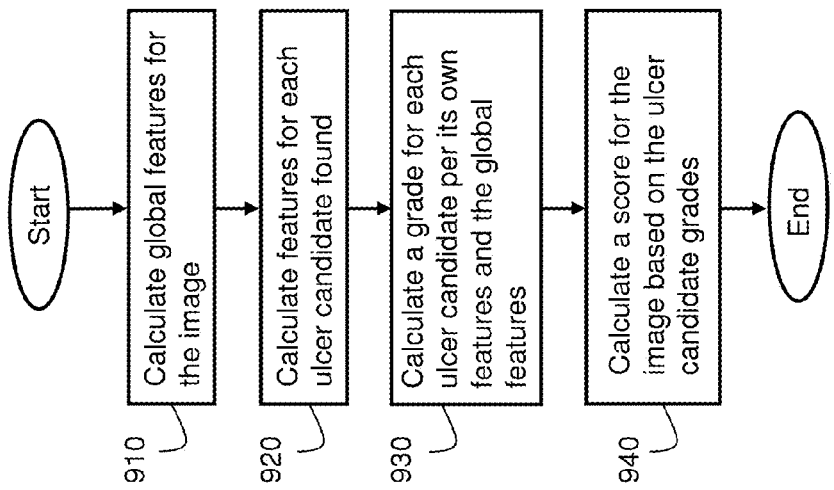

FIG. 9A is a flowchart of a method for determining the probability that an image captured in vivo contains at least one ulcer according to some embodiments. After an image is captured in vivo, global features of, or related to, the image may be calculated, at operation 910, in order to characterize the image as a whole. The global features may be used in conjunction with features that are extracted from each ulcer candidate, to thereby characterize each ulcer candidate individually. Global features may be used, among other things, to decrease scores to images that are mostly red, for example images of the stomach, or if they show mostly content, for example images of the colon. (Using some of the global features decreases the probability of finding ulcers in images that are mostly red or mostly content. This may help removing such images to save computation resources. However, if other features, such as geometrical shape or absolute values of color(s) are more dominant, ulcers may still be detected in these images.)

Ulcers may not be detectable in images that are mostly red and in images that are filled with content because in a mostly red image the ulcer red region may not be recognizable due to the 'camouflaging' effect of the non ulcer red image, and, in an image full of content, content may hide ulcers. Assigning low scores to these types of images mitigates the aforesaid effects.

Each global feature may have the same value for each candidate in an image. If an image has a high average content score and several ulcer candidates with varying features for each ulcer candidate, then all the ulcer candidate grades may be decreased/lowered due to the high average content score. However if the rest of the features of an ulcer candidate indicate that the ulcer candidate is an ulcer, a determination may be made, that there is an ulcer in the image. This manipulation of features is useful in reducing false alarms in certain types of images.

During operation 920, candidate features may be calculated for each ulcer candidate found. During operation 930, a rating or grade may be calculated for each ulcer candidate based on its own features and, optionally, also based on global features that may be calculated for the image as a whole. During operation 940, a score may be calculated for the image based on the ulcer candidate grades.

FIG. 9B is a flowchart of a method for determining the probability that an image captured in vivo contains at least one ulcer according to some embodiments. Operations 912 and 922 may respectively be identical or similar to operations 910 and 920. During operation 932, the calculated features may be input to, or analyzed by, a trained classifier, and the trained classifier may output grades, one grade per ulcer candidate, indicative of the probability that the respective ulcer candidate is an ulcer. During operation 942, the image may be scored by selecting the grade that indicates the highest probability that the pertinent ulcer candidate is an ulcer. Other grades-related criteria may be used to score the image.

Figure 10:
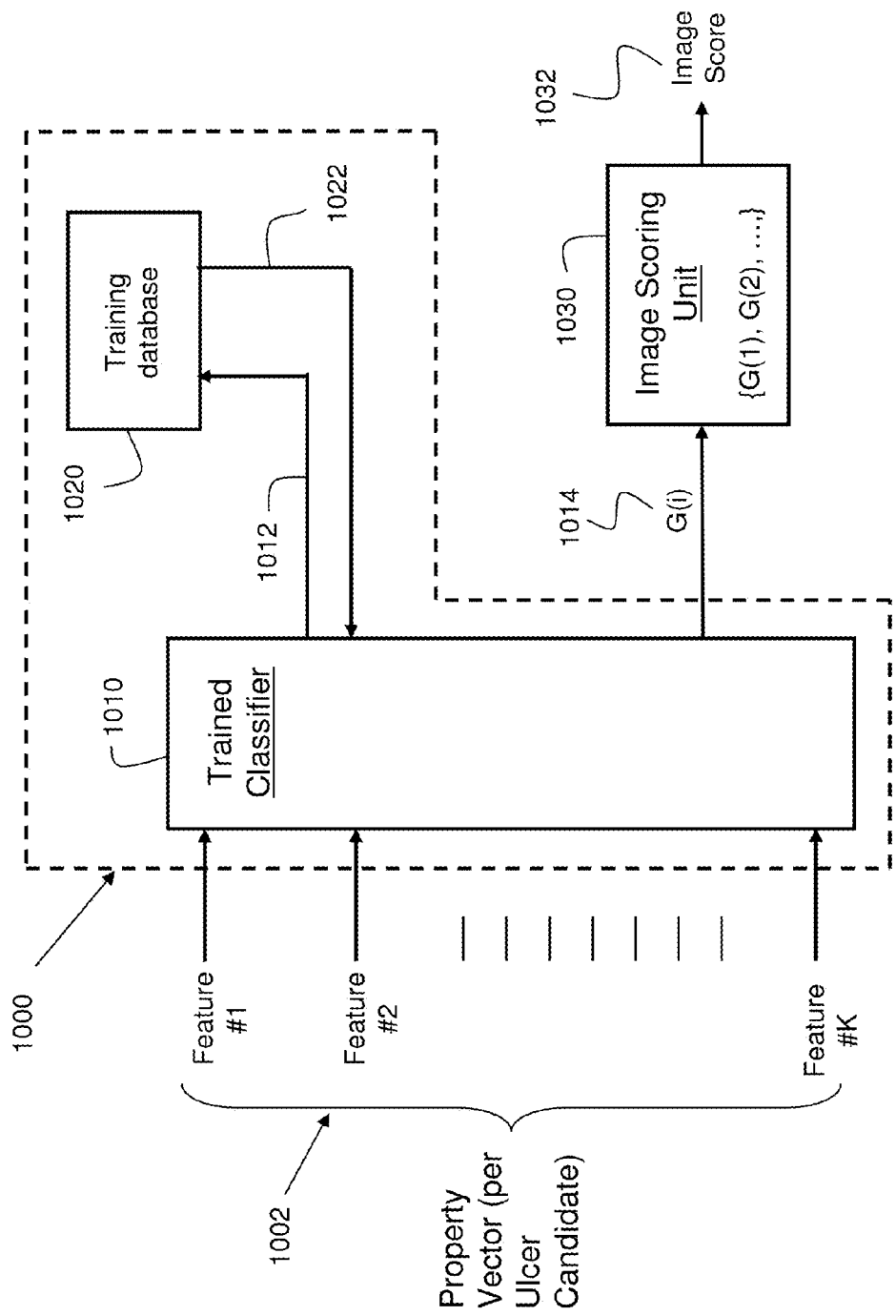
FIG. 10 is an ulcer candidate grading unit according to embodiments of the present invention.

FIG. 10 schematically illuminates an ulcer candidates grading unit 1000 according to an example embodiment. Ulcer candidate grading unit 1000 may be identical or similar to ulcer candidate grading unit 270 of FIG. 2. Ulcer candidate grading unit 1000 may include a trained classifier 1010 and a training database 1020.

During a training session, global features related to training images and candidate features related to training ulcers are calculated, and the resultant numbers may be input to trained classifier 1010 as property vector 1002 that may include k features that may include global features and candidate features. (The values of property vector 1002 may change per the specific feature values of each ulcer candidate). Trained classifier 1010 may store 1012 the resultant numbers in training database 1020 for reference, During routine operation (for a particular image), when a particular ulcer candidate is to be graded, a vector of features including global features related to the image and candidate features pertaining to the particular ulcer candidate is calculated for the particular ulcer candidate, and the resultant numbers derived from the particular ulcer candidate is input to trained classifier 1010.

Trained classifier 1010 may retrieve 1022 data which is stored in training database 1020, and compare or correlate the numbers derived from the particular ulcer candidate to the retrieved data in order to determine the extent to which the particular ulcer candidate is morphologically close to (e.g., matches or resembles) an ulcer whose features were calculated and stored in training database 1020 during the training session. Trained classifier 1010 may, then, output 1014 a grade, G(i), that indicates the extent to which the particular ulcer candidate is morphologically close to an ulcer whose features were calculated and stored in training database 1020 during the training session. Since training database 1020 may hold features-related data that characterize two or more (real) ulcers, trained classifier 1010 may repeat the grade calculation for each (real) ulcer. That is, derived from the input features vector and the training (real) ulcers, each grade indicates the probability that the ulcer candidate resembles a training ulcer. Trained classifier 1010 may output 1014 the highest grade, G(i), which is the grade for which the ulcer candidate is morphologically the closest to a specific training ulcer.

Trained classifier 1010 may be a supervised learning classifier such as a neural network classifier, a Fisher linear discriminant classifier, a sparse network of Winnows classifier, a decision tree classifier, a Bayes classifier, a support vector machine, or an AdaBoost classifier. The classifier may be trained in advance using a set of positive examples and a set of negative examples. Alternatively, unsupervised learning classifiers may be used.

The grades that trained classifier calculates for the ulcer candidates in the image may be stored in, for example, image scoring unit 1030, or they can be stored in another storage unit (e.g., storage unit 230) and made available to, or accessible by, image scoring unit 1030. Image scoring unit 1030 may output 1032 a score for the image (e.g., an image score) based on all, or some of, the grades calculated for the ulcer candidates in the image.

Throughout the application the term 'vector' may relate to an ordered list of parameters, ratings, or other numbers or data items. For example, a features vector may include or be an ordered list of data structure including various parameters describing features/properties of the related ulcer candidate, such as parameters related to the color, size and shape of the ulcer candidate including ulcer head candidate and ulcer red region candidate of the ulcer candidate, and global features. For example, the features vector relating to ulcer candidates may include some or all of the features listed herein, though other parameters, similar to these listed herein may be used as well. Some of the features listed herein are presented with relation to R-G-B and HSV cylindrical-coordinate representation formats; however, similar or equivalent features may be defined for other image representation formats.

Figure 11B:
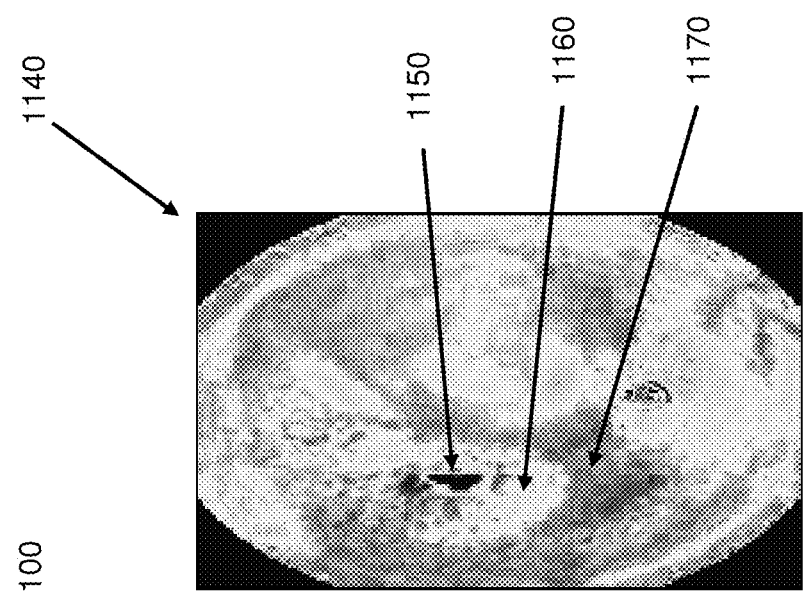
FIG. 11B is an image in which the ulcer head shown in FIG. 11A is made conspicuous according to embodiments of the present invention.
Figure 11A:
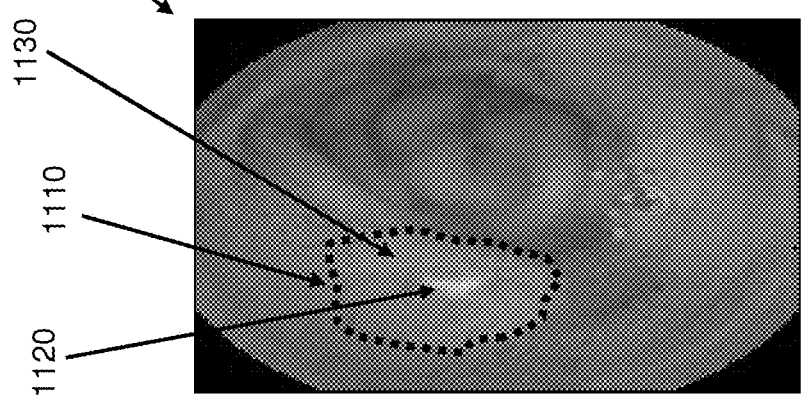
FIG. 11A is an example image including an ulcer.
Figure 11C:
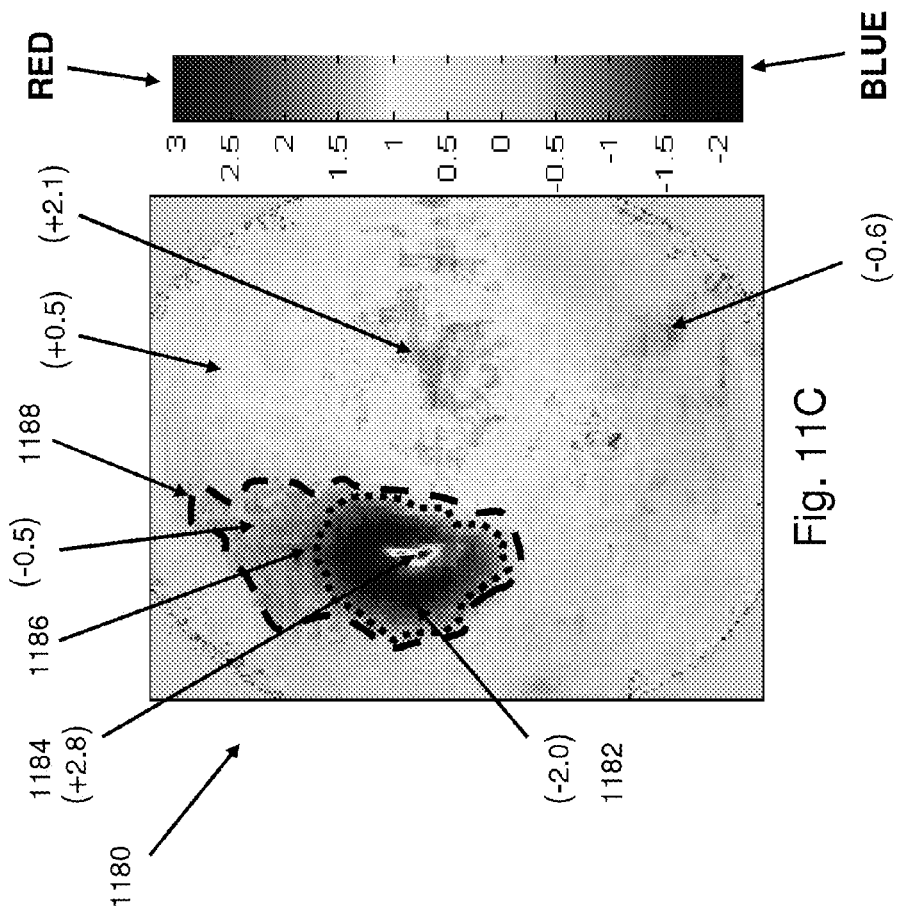
FIG. 11C is an image in which the ulcer red region shown in FIG. 11A is made conspicuous according to embodiments of the present invention.

FIG. 11A depicts an example image 1100 of a GI tract. Image 1100 contains an ulcer 1110 that includes an ulcer head 1120 and an ulcer red region 1130. FIG. 11B depicts an image 1140 that was obtained by assigning, or calculating, ulcer head scores for the image 1100 of FIG. 11A according to an example embodiment. By way of example, the scoring method used to obtain image 1140 was the 'red score' method, which, as described herein, indicates the distance of a pixel's color from red color. Assigning/calculating red scores to image 1100 makes ulcer head 1120 conspicuous relative to its background, as described herein and shown at 1150. Ulcer head 1150, which is very much not red (it is relatively 'far' from red), is shown in FIG. 11B (at 1150) mostly blue, where 'blue' may have, say, a red score value (−2.50) in the red scores' range, whereas ulcer red region 1130 is shown in FIG. 11B (at 1160) mostly green, where 'green' may have, say, a red score value (−0.30) in the red scores' range. Area 1170 is mostly red, where 'red' may have, say, a red score value (+2.5) in the red scores' range. (An example color range and example red score range for that range are depicted in FIG. 11C, which is described below.) Ulcer head 1150 was obtained by applying a specific threshold level on the red scores; depending on the values of the red scores, applying a different threshold level on the red scores may result in an ulcer head that is somewhat different (in size, in shape, or both) from ulcer head 1150.

FIG. 11C depicts an image 1180 that was obtained by assigning or calculating ulcer red region scores for the image 1100 of FIG. 11A according to an example embodiment. By way of example, the scoring method used to obtain image 1180 was the 'ulcer score' method, which, as described herein, enhances the differentiation between ulcer heads and ulcer red regions. Assigning/calculating ulcer scores to image 1100 makes ulcer red region 1130 conspicuous relative to its background and, in particular, relative to the ulcer head 1120: using the ulcer scores results in ulcer red region 1130 (in FIG. 11C) shown as ulcer red region 1182 that is characterized by having relatively high score values (e.g., −2.0), as opposed to ulcer head 1120 (in FIG. 11C) that is shown as ulcer head 1184 that is characterized by having relatively high score values (e.g., +2.8).

Ulcer red region 1186 was obtained by applying a specific threshold level on the red scores; depending on the values of the ulcer scores, applying a different threshold level on the ulcer scores may result in an ulcer red region that is somewhat different (in size, in shape, or both) from ulcer head 1182. For example, using a different threshold level may result in an enlarged ulcer red region area 1188 that may include additional ulcer scores that pass the threshold level.

Figure 12A:
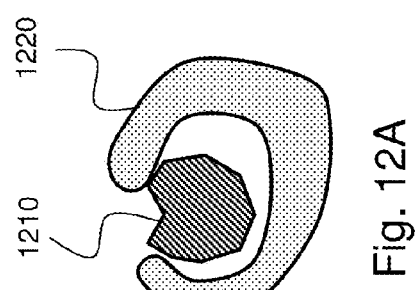
FIGS. 12A and 12B schematically illustrate a potential ulcer head candidate and two potential ulcer red region candidates according to an example embodiment.
Figure 12B:
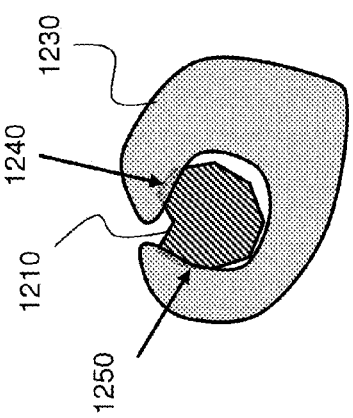

FIGS. 12A and 12B schematically illustrate a potential ulcer head candidate and two potential ulcer red region candidates according to an example embodiment. Referring to FIG. 12A, and assuming that ulcer head scores and ulcer red region scores corresponding to a particular image are stored, for example, in storage unit 230 of FIG. 2, application of a particular threshold level on the ulcer head scores may result in potential ulcer head candidate 1210, and application of a first threshold level, TH1, on the ulcer red region scores may result in a first potential ulcer red region candidate 1220. Referring to FIG. 12B, application of a second threshold level, TH2, on the (same) ulcer red region scores may result in a second potential ulcer red region candidate 1230. As described above, a plurality of threshold levels may be applied to ulcer head scores and to ulcer red region scores in order to obtain or find a plurality of potential ulcer head candidates and a plurality of potential ulcer red region candidates. FIGS. 12A-12B illustrates an example where one potential ulcer red region candidate (in this example one out of two potential ulcer red region candidates 1220 and 1230), which is more suitable for potential ulcer head candidate 1210, is searched for. If application of suitability criteria shows that only one potential ulcer red region candidate (e.g., potential ulcer red region candidate 1230) qualifies as a potential ulcer red region candidate, then the qualifying potential ulcer red region candidate is paired with ulcer head candidate to form therewith an ulcer candidate. However, if application of the suitability criteria shows that both potential ulcer red region candidates 1220 and 1230 qualify as potential ulcer red region candidates, then the suitability formula may be applied to them in order to determine which one suits potential ulcer head candidate 1210 better. Since potential ulcer red region candidates 1230 shows better area overlapping, as shown at 1240, and better perimeter overlapping, as shown at 1250, potential ulcer red region candidate 1230 may be determined to be the ulcer red region candidate that is more suitable for (e.g., it may be paired with) ulcer head candidate 1210. The ulcer head/ulcer red region pairing scheme described in connection with FIGS. 12A-12B conform to the method described in connection with, for example, FIG. 7 and FIG. 8A, where a suitable ulcer red region candidate may be searched for among a plurality of potential ulcer red region candidates for a particular ulcer head candidate.

According to embodiments of the present invention, the indication of the probability that an image includes an ulcer may be used for editing a moving image stream of the GI tract. For example, images with indication of high probability (e.g., above a predetermined threshold) that the image includes an ulcer may be presented to a health professional for further analysis. For example, these images may be presented on images monitor 18. Optionally, a visual mark may be added on the presented image to indicate the location of a suspected ulcer. Other indications correlating to an indication of the probability that an ulcer candidate is an ulcer, or that an image includes an ulcer, may be displayed, for example on monitor 18, or stored, or otherwise made use of.

Some embodiments of the present invention may be implemented in software for execution by a processor-based system. For example, embodiments of the present invention may be implemented in code and may be stored on a storage medium having stored thereon instructions which can be used to program a system to perform the instructions. Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EE-PROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for ulcer detection, the method comprising:
   obtaining an image comprising image pixels;
   calculating ulcer head scores for image pixels, each score correlated to the probability that the color of the associated image pixel is typical to ulcer heads;
   calculating ulcer red region scores for image pixels, each score correlated to the probability that the color of the associated image pixel is typical to ulcer heads, or to ulcer red regions, or to a region that is neither ulcer head nor ulcer red region;
   comparing the ulcer head scores to an ulcer head threshold level and, based on the comparison results, obtaining potential ulcer head candidates;
   comparing the ulcer red region scores to an ulcer red region threshold level and, based on the comparison results, obtaining potential ulcer red region candidates;
   forming ulcer candidates by creating pairs, each pair including a potential ulcer head candidate and a potential ulcer red region candidate;
   determining a grade for each ulcer candidate, the grade indicating the probability that the ulcer candidate is an ulcer; and
   determining a score for the image based on the grades, the score indicating the probability that the image includes an ulcer.

2. The method of claim 1, wherein the creating pairs comprises:
   determining, based on suitability criteria, which potential ulcer red region candidates are suitable for which potential ulcer head candidate.

3. The method of claim 2, comprising removing potential ulcer head candidates for which no suitable potential ulcer red region candidate can be found, or potential ulcer red region candidates for which no suitable potential ulcer head candidate can be found.

4. The method of claim 2, wherein the suitability criteria comprises at least one of:
   a head perimeter overlapping (HPO) criterion indicating the extent of overlap between a perimeter of a potential ulcer red region candidate and a perimeter of a potential ulcer head; and
   a head area overlapping (HAO) criterion indicating the extent of overlap between an area of a potential ulcer red region candidate and an area of a potential ulcer head.

5. The method of claim 1, wherein comparing the ulcer head scores to the ulcer head threshold level comprises removing potential ulcer head candidates whose pixel area exceeds a predetermined size, and wherein comparing the ulcer red region scores to the ulcer red region threshold level comprises removing potential ulcer red region candidates whose pixel area exceeds a predetermined size.

6. The method of claim 1, wherein determining a grade for an ulcer candidate comprises:
calculating a property vector comprising features describing properties of the ulcer candidate; and
employing a classifier on the property vector to generate the grade from the property vector.

7. The method of claim 1, wherein an ulcer head score indicates closeness of an image pixel's color to the red color.

8. The method of claim 1, wherein an ulcer red region score indicates closeness of an image pixel's color relative to two, visually distinct, colors.

9. The method of claim 1, wherein calculating an ulcer head score and an ulcer red region score for a particular pixel comprises classification of the color of the image pixel by a classifier.

10. The method of claim 9, wherein the classifier is a support vector machine (SVM)-radial basis function (RBF) type classifier.

11. The method of claim 9, wherein the classifier is trained using training images.

12. The method of claim 1, wherein the ulcer head threshold level is selected among a plurality of ulcer head threshold levels, and each ulcer head threshold level provides additional potential ulcer head candidates.

13. The method of claim 1, wherein the ulcer red region threshold level is selected among a plurality of ulcer red region threshold levels, and each ulcer head threshold level provides additional potential ulcer head candidates.

14. The method of claim 1, wherein image pixels are represented in a format selected from the group consisting of: R-G-B; hue, saturation, and value (HSV); hue, saturation, and lightness (HSL); and YCbCr.

15. A method for ulcer detection, the method comprising:
obtaining an image comprising image pixels;
calculating ulcer head scores and ulcer red region scores for image pixels;
comparing the ulcer head scores to an ulcer head threshold level and, based on the comparison results, obtaining potential ulcer head candidates;
comparing the ulcer red region scores to an ulcer red region threshold level and, based on the comparison results, obtaining potential ulcer red region candidates;
forming ulcer candidates by creating pairs, each pair including a potential ulcer head candidate and a potential ulcer red region candidate, wherein creating the pairs comprises determining, based on suitability criteria, which potential ulcer red region candidates are suitable for which potential ulcer head candidate;
determining a grade for each ulcer candidate, the grade indicating the probability that the ulcer candidate is an ulcer; and
determining a score for the image based on the grades, the score indicating the probability that the image includes an ulcer.

16. A system for ulcer detection in in vivo images, comprising:
a storage unit for storing an image comprising image pixels; and
a processor to:
calculate ulcer head scores for the image pixels, each score correlated to the probability that the color of the associated image pixel is typical to ulcer heads;
calculate ulcer red region scores for the image pixels, each score correlated to the probability that the color of the associated image pixel is typical to ulcer heads, or to ulcer red regions, or to a region that is neither ulcer head nor ulcer red region;
compare the ulcer head scores to an ulcer head threshold level and, based on the comparison results, obtaining potential ulcer head candidates;
compare the ulcer red region scores to an ulcer red region threshold level and, based on the comparison results, obtaining potential ulcer red region candidates;
form ulcer candidates by creating pairs, each pair including a potential ulcer head candidate and a potential ulcer red region candidate;
determine a grade for each ulcer candidate, the grade indicating the probability that the ulcer candidate is an ulcer; and
determine a score for the image based on the grades, the score indicating the probability that the image includes an ulcer.

17. The system of claim 16 comprising a display to display the determined score for the image, the score indicating the probability that the image includes an ulcer.

18. The system of claim 16 wherein the processor is to determine, based on suitability criteria, which potential ulcer red region candidates are suitable for which potential ulcer head candidate.

19. The system of claim 16 comprising a classifier to generate the grade from a property vector, the property vector comprising features describing properties of the ulcer candidate.

20. The system of claim 16 comprising a classifier to classify the color of the image pixels, wherein the processor is to calculate an ulcer head score and an ulcer red region score for a particular pixel based on the classification.

* * * * *